United States Patent
Krylov

(10) Patent No.: US 12,271,506 B2
(45) Date of Patent: Apr. 8, 2025

(54) METHOD AND A SYSTEM FOR PROCESSING TRANSACTIONS BETWEEN ENTITIES

(71) Applicant: Group IB, Ltd, Moscow (RU)

(72) Inventor: Pavel Vladimirovich Krylov, Moscow (RU)

(73) Assignee: F.A.C.C.T. ANTIFRAUD LLC, Moscow (RU)

(*) Notice: Subject to any disclaimer, the term of this patent is extended or adjusted under 35 U.S.C. 154(b) by 258 days.

(21) Appl. No.: 18/134,669

(22) Filed: Apr. 14, 2023

(65) Prior Publication Data

US 2024/0086575 A1 Mar. 14, 2024

(30) Foreign Application Priority Data

Sep. 13, 2022 (RU) ................................ 2022124168

(51) Int. Cl.
*G06F 21/62* (2013.01)
*G06F 21/60* (2013.01)
*H04L 9/14* (2006.01)

(52) U.S. Cl.
CPC ........ *G06F 21/6254* (2013.01); *G06F 21/602* (2013.01); *H04L 9/14* (2013.01)

(58) Field of Classification Search
CPC ....... G06F 21/6254; G06F 21/602; H04L 9/14
See application file for complete search history.

(56) References Cited

U.S. PATENT DOCUMENTS

| 8,510,820 B2 | 8/2013 | Oberheide et al. |
| 9,154,388 B2 | 10/2015 | Savage et al. |

(Continued)

FOREIGN PATENT DOCUMENTS

| JP | 2011257810 A | 12/2011 |
| JP | 5581820 B2 | 9/2014 |
| RU | 2607990 C1 | 1/2017 |
| RU | 2691830 C1 | 6/2019 |

(Continued)

OTHER PUBLICATIONS

"Card not present transaction", Wikipedia, en.wikipedia.org/wiki/Card_not_present_transaction accessed Mar. 27, 2023, pdf 3 pages.

(Continued)

*Primary Examiner* — Jonathan A Bui
(74) *Attorney, Agent, or Firm* — BCF LLP

(57) ABSTRACT

A method and server for processing transactions between clients of a subscriber entity and a non-subscriber entity are provided. The method comprises: receiving, from a sender entity server, a request for a transaction between the sender entity and a client of a recipient entity; in response to the recipient entity being the non-subscriber entity; transmitting a first portion of the client's ID to a first anonymizing entity server for generating a first anonymized portion; transmitting a second portion of the client's ID to a second anonymizing entity server for generating a second anonymized portion; combining the first and second portions, thereby generating the client's anonymized ID; determining, based on the client's anonymized ID, a client's evaluation score of the client of the recipient entity; and in response to the client's evaluation score being greater than a predetermined threshold, allowing the request for the transaction between the sender and recipient entities.

54 Claims, 8 Drawing Sheets

(56) References Cited

U.S. PATENT DOCUMENTS

| | | |
|---|---|---|
| 9,419,951 B1 | 8/2016 | Felsher et al. |
| 10,089,683 B2 | 10/2018 | Dominguez |
| 10,153,901 B2 | 12/2018 | Thackston |
| 10,339,606 B2 | 7/2019 | Gupta et al. |
| 10,706,423 B1 | 7/2020 | Kuo et al. |
| 10,785,287 B2 | 9/2020 | Prakash et al. |
| 11,170,130 B1 | 11/2021 | Blumberg et al. |
| 11,259,183 B2 | 2/2022 | Richardson et al. |
| 11,386,983 B2 | 7/2022 | Miyamoto et al. |
| 2011/0196791 A1 | 8/2011 | Dominguez |
| 2012/0198535 A1 | 8/2012 | Oberheide et al. |
| 2015/0006384 A1 | 1/2015 | Shaikh |
| 2015/0372888 A1 | 12/2015 | Savage et al. |
| 2021/0097534 A1* | 4/2021 | Kurian ................ G06Q 20/10 |
| 2021/0243596 A1* | 8/2021 | Lim ...................... H04W 8/20 |
| 2021/0319437 A1 | 10/2021 | Johnson et al. |
| 2021/0352049 A1* | 11/2021 | Aabye ............... H04L 63/0414 |

FOREIGN PATENT DOCUMENTS

| | | |
|---|---|---|
| RU | 2795371 C1 | 5/2023 |
| WO | 2016135708 A1 | 9/2016 |

OTHER PUBLICATIONS

Search Report with regard to the counterpart RU Patent Application No. 2022124168 completed Mar. 27, 2023.

Search Report with regard to the RU Patent Application No. 2020133675 completed on Mar. 3, 2021.

English Abstract for JP2011257810/JP5581820B2 retrieved on Espacenet on Apr. 14, 2021.

Search Report with regard to the counterpart NL Patent Application No. 2034890 completed Feb. 23, 2024.

"Privacy enhancing data de-identification terminology and classification of techniques", Project Editor/Co-Editor, ISO/IEC 20889, 2018, 62 pages.

* cited by examiner

METHOD AND A SYSTEM FOR PROCESSING TRANSACTIONS BETWEEN ENTITIES

CROSS-REFERENCE

The present application claims priority to a Russian Patent Application No.: 2022124168, filed on Sep. 13, 2022, and entitled "A METHOD AND A SYSTEM FOR ANONYMIZED EVALUATION OF CLIENTS OF ORGANIZATIONS TO CONDUCT TRANSACTIONS BETWEEN THE ORGANIZATIONS", the content of which is incorporated herein by reference in its entirety.

FIELD

The present technology relates broadly to the field of cybersecurity; and in particular, to methods and systems for processing transactions between the entities.

BACKGROUND

According to a report of the KPMG analytical center, published in the "Global study on issues of bank frauds", there was an increase in number of bank fraud schemes during the period between 2015 and 2018, including thefts of personal data and accounts, cyberattacks, CNP-attacks ("card not present fraud", en.wikipedia.org/wiki/Card_not_present transaction). The report also notes a significant growth of authorized payments in favor of fraudsters: the fraudsters manipulate bank clients and trick them into transferring money in a fraudulent way, bypassing banks' control systems. In spite of the fact that most of the deceived clients have transferred money to accounts of the fraudsters on their own volition, they believe that the banks themselves must have mitigated attempts of fraudulent actions.

Banks and other commercial and non-commercial entities around the world invest funds in the development of new technologies for mitigating fraudulent actions: by receiving signals about fraudulent actions in real time, using machine learning algorithms, by using biometrics, behavioral biometrics etc. Most of the existing solutions for preventing and addressing cyber threats have been implemented by accumulating and analyzing a data about clients' transactions.

For example, U.S. Pat. No. 10,706,423-B1, issued on Jul. 7, 2020, assigned to Capital One Services LLC, and entitled "SYSTEMS AND METHODS FOR MITIGATING FRAUDULENT TRANSACTIONS", discloses systems and methods for mitigation of fraudulent transactions. In some embodiments, a server is communicatively coupled to a user device, and is configured to receive a proposed transaction from a merchant device communicatively coupled to the server, apply a dynamic classification algorithm to the proposed transaction to determine if the proposed transactions appears to be fraudulent, generate a user verification request when the proposed transaction appears to be fraudulent, transmit the user verification request to a user computing device communicatively coupled to the server, receive an approval or a refusal of the proposed transaction based on the user verification request, and process the proposed transaction based on the received approval or refusal of the proposed transaction.

Also, U.S. Pat. No. 10,339,606-B2, issued on Jul. 2, 2019, assigned to American Express Travel Related Services Co Inc., and entitled "SYSTEMS AND METHODS FOR AN AUTOMATICALLY-UPDATING FRAUD DETECTION VARIABLE", discloses systems and methods including receiving a plurality of transactions for a plurality of consumers, wherein each respective transaction of the plurality of transactions is between a consumer of the plurality of consumers and a merchant of a plurality of merchants; automatically inputting the plurality of transactions into a neural network; automatically analyzing the plurality of transactions over a plurality of iterations, wherein an iteration of the plurality of iterations comprises cycling through a consumer transaction history associated with the consumer, wherein the consumer transaction history has a consumer transaction sequence associated with the consumer; and automatically updating over the plurality of iterations, a previous fraud detection variable associated with the consumer and/or the merchant to generate updated fraud detection variables, in response to the analyzing the plurality of transactions.

Both above references are directed to an analysis of the bank clients' data. Each of the banks has access to results of the analysis of its own clients only. It is not possible to obtain any information about a recipient of funds in another bank, or the information will be limited to only historical data about the recipient stored by a sender bank.

Further, U.S. Pat. No. 10,089,683-B2, issued on Oct. 2, 2018, assigned to Visa International Service Association, and entitled "FRAUD PREVENTION SYSTEM FOR TRANSACTIONS", discloses a system, apparatus, and method for reducing fraud in payment or other transactions by providing issuers with a warning that a transaction being processed for authorization is potentially fraudulent. In some embodiments, the present invention processes data obtained from a consumer authentication process that is used in "card not present" (CNP) transactions to determine characteristics or indicia of fraud from previous transactions. The characteristics or indicia of fraud can be used to generate a set of fraud detection rules or another form of fraud assessment model.

Aside from the solutions reviewed above, the prior art also teaches that it is possible to supplement the clients' data by connecting the banks to open bank platforms. However, most of the banks reasonably consider the open bank platforms as an additional serious threat in terms of a fraud since an access to the clients' data within these platforms is given to third parties.

SUMMARY

It is an object of the present technology to address at least some of the inconveniences present in the prior art.

In contrast to the existing open bank platforms, certain non-limiting embodiments of the present technology are directed to allowing the entities to exchange scorings of users without granting access to their data among each other. The proposed solution performs data anonymization, and the anonymized data are stored and updated on a server such that a server owner is not able to identify clients of the banks as well.

Another significant advantage of the presents methods and systems is that they enable to store and to update the scoring not for a single detail only, but for a client of the entity as a whole, e.g., those of the bank that may have several details within one or more entities.

Additionally, the present methods are directed to using encryption algorithms, such as an asymmetric encryption algorithm as one of secure data transmission approaches. It will be clear for a skilled artisan that it is acceptable to use any existing encryption algorithms to implement the present methods.

More specifically, in accordance with a first broad aspect of the present technology, there is provided a computer-implementable method for processing transactions between clients of a plurality of entities including subscriber entities and a non-subscriber entities. The method is executed by a server communicatively coupled to servers of a plurality of subscriber entities. The server includes a processor. The method comprises: during a first stage, executing: receiving, by the processor, data indicative of configurations of each of the plurality of subscriber entities from the servers of the subscriber entities; and storing, by the processor, the data indicative of configurations of each of the plurality of subscriber entities in a configuration database of the server, the configuration database being accessible to the servers of each of the plurality of subscriber entities. Further, during a second stage, the method comprises executing: receiving, by the processor, from a server of a sender entity, the sender entity being one of the plurality of subscriber entities, a transaction request for a transaction between the sender entity and a recipient entity, the request comprising: a sender entity ID of the sender entity; a recipient entity ID of the recipient entity; and a client's encrypted ID of a client of the recipient entity; in response to the recipient entity being one of the plurality of subscriber entities, executing: transmitting, by the processor, the client's encrypted ID to an anonymizing entity server for generating a client's anonymized ID of the client of the recipient entity; and receiving, by the processor, the client's anonymized ID from the anonymizing entity server; in response to the recipient entity being the non-subscriber entity, executing: transmitting, by the processor, a first portion of the client's encrypted ID to a first anonymizing entity server for generating, using an anonymizing algorithm, a first anonymized portion of the client's anonymized ID; transmitting, by the processor, a second portion of the client's encrypted ID to a second anonymizing entity server for generating, using the anonymizing algorithm, a second anonymized portion of the client's anonymized ID, the second anonymizing entity server being different from the first anonymizing entity server; receiving, by the processor, the first portion of the client's anonymized ID from the first anonymizing entity server; receiving, by the processor, the second portion of the client's anonymized ID from the second anonymizing entity server; and combining, by the processor, the first and second portions of the client's anonymized ID, thereby generating the client's anonymized ID; and determining, by the processor, based on the client's anonymized ID, a client's evaluation score of the client of the recipient entity; and transmitting, by the processor, the client's evaluation score to the server of the sender entity, thereby causing the server of the sender entity to allow or reject the transaction request between the sender and recipient entities based on the client's evaluation score.

In some implementations of the method, the method further comprises: storing, by the processor, the client's evaluation score in a shared database of clients' evaluation scores of the server; and in response to receiving, by the processor, an additional information about the transaction request from the server of the sender entity: updating, based on the additional information, the client's evaluation score of the client associated with the client's anonymized ID; and saving, by the processor, the updated client's evaluation score in the shared database of clients' evaluation scores of the server.

In some implementations of the method, the method further comprises transmitting the updated client's evaluation score to the recipient entity.

In some implementations of the method, the data indicative of configuration of a given subscriber entity of the plurality of subscriber entities comprise at least one: a subscriber entity ID of the given subscriber entity; a certificate of the given subscriber entity including a respective public key; a URL of the given subscriber entity; and
  templates of clients' IDs which are anonymized on the
    server of the given subscriber entity.

In some implementations of the method, the data indicative of configuration of the given subscriber entity further comprises a URL of a resource that confirms an authenticity of the configuration of the given subscriber entity.

In some implementations of the method, the URL of the resource is not associated with the server.

In some implementations of the method, the URL resource is an official URL of the given subscriber entity.

In some implementations of the method, during the first stage, the method further comprises dividing, by the processor, the servers of the plurality of subscriber entities into subgroups of servers.

In some implementations of the method, the method further comprises receiving, by the processor, from each of the subgroups of servers, a respective public key.

In some implementations of the method, the respective public key is associated with a given subgroup of servers of the subscriber entities.

In some implementations of the method, the dividing the servers of the plurality of subscriber entities into the subgroups comprises executing, by the processor, a script.

In some implementations of the method, the executing the script comprises: transmitting, by the processor, the script to the server of the sender entity, thereby causing the server of the sender entity to execute the script; and receiving, by the processor, from the server of the sender entity, a response triggered by executing the script, the response being indicative of how the servers of the plurality of subscriber entities have been divided into the subgroups.

In some implementations of the method, the method further comprises selecting, by the processor, in each subgroup of the subgroups of servers, at least one anonymizing entity server.

In some implementations of the method, the selecting comprises executing, by the processor, an other script.

In some implementations of the method, the executing the other script comprises: transmitting, by the processor, the other script to the server of the sender entity, thereby causing the server of the sender entity to execute the other script; and receiving, by the processor, from the server of the sender entity, a response triggered by executing the other script, the response being indicative of which server in each subgroup of the subgroups of servers has been selected as the at least one anonymizing server.

In some implementations of the method, the receiving the data indicative of the configuration of each one of the plurality of subscriber entities further comprises receiving, therefrom, clients' anonymized IDs and evaluation scores of clients of each one of the plurality of subscriber entities.

In some implementations of the method, the method further comprises assigning the clients' anonymized IDs with respective ones of clients' evaluation scores received from a respective subscriber entity.

In some implementations of the method, during the first stage, the method further comprises creating a shared database of the clients' evaluation scores based on the received clients' anonymized IDs and evaluation scores.

In some implementations of the method, the shared database of the clients' anonymized evaluation scores is configured to store at least one of: the client's anonymized IDs; the client's evaluation scores that are associated with the client's anonymized ID; non-subscriber entity IDs; and subscriber entity IDs.

In some implementations of the method, the method further comprises receiving, by the processor, at least one redundant client's anonymized ID associated with the client's anonymized ID, both the client's anonymized ID and at least one redundant client's anonymized ID being associated with a same client.

In some implementations of the method, the at least one redundant client's anonymized ID is similar to the client's anonymized ID.

In some implementations of the method, the receiving the at least one redundant client's ID is in response to at least one additional request to the anonymizing entity server.

In some implementations of the method, the at least one additional request is triggered by the processor of the server.

In some implementations of the method, the anonymizing entity server is a server of the recipient entity.

In some implementations of the method, the anonymizing entity server is one of the servers of the plurality of subscriber entities.

In some implementations of the method, the client's encrypted ID includes a first encrypted portion and a second portion of the client's encrypted ID.

In some implementations of the method, the client's encrypted ID has been encrypted using an asymmetric encryption algorithm.

In some implementations of the method, the client's encrypted ID has been encrypted using a symmetric encryption algorithm.

In some implementations of the method, the client's encrypted ID has been encrypted further using a unique key of the server of the recipient entity.

In some implementations of the method, the client's encrypted ID has been encrypted further using a private key of the server of the recipient entity.

In some implementations of the method, the first anonymizing entity server is a first available entity server among a first subgroup of the subscriber entities.

In some implementations of the method, the second anonymizing subscriber entity server is a first available entity among a second subgroup of the subscriber entities, the first and second subgroups not overlapping.

In some implementations of the method, the combining of the first portion of the client's anonymized ID with the second portion of the client's anonymized ID comprises concatenating the first second portions of the client's anonymized ID.

In some implementations of the method, a given subscriber entity of the plurality of subscriber entities is an entity that transmits, to the server, in advance, at least one of: data for creating a shared database of the clients' anonymized evaluation scores; the data indicative of the configuration of the given subscriber entity.

In some implementations of the method, the anonymizing algorithm comprises one of a hashing algorithm and a symmetric encryption algorithm.

In some implementations of the method, the first stage is executed prior to the second stage.

In some implementations of the method, the first stage and the second stage are executed at least partially concurrently.

In accordance with a second broad aspect of the present technology, there is provided a server for processing transactions between clients of a plurality of entities including subscriber entities and a non-subscriber entities. The server comprises: (i) a processor and (ii) a non-transitory computer-readable memory storing instructions. The processor, upon executing the instructions, is configured to: during a first stage, execute: receiving data indicative of configurations of each of the plurality of subscriber entities from the servers of the subscriber entities; and storing the data indicative of configurations of each of the plurality of subscriber entities in a configuration database of the server, the configuration database being accessible to the servers of each of the plurality of subscriber entities. Further, during a second stage, the processor is configured to execute: receiving, from a server of a sender entity, the sender entity being one of the plurality of subscriber entities, a transaction request for a transaction between the sender entity and a recipient entity, the request comprising: a sender entity ID of the sender entity; a recipient entity ID of the recipient entity; and a client's encrypted ID of a client of the recipient entity; in response to the recipient entity being one of the plurality of subscriber entities, executing: transmitting the client's encrypted ID to an anonymizing entity server for generating a client's anonymized ID of the client of the recipient entity; and receiving the client's anonymized ID from the anonymizing entity server; in response to the recipient entity being the non-subscriber entity, executing: transmitting a first portion of the client's encrypted ID to a first anonymizing entity server for generating, using an anonymizing algorithm, a first anonymized portion of the client's anonymized ID; transmitting a second portion of the client's encrypted ID to a second anonymizing entity server for generating, using the anonymizing algorithm, a second anonymized portion of the client's anonymized ID, the second anonymizing entity server being different from the first anonymizing entity server; receiving the first portion of the client's anonymized ID from the first anonymizing entity server; receiving the second portion of the client's anonymized ID from the second anonymizing entity server; and combining the first and second portions of the client's anonymized ID, thereby generating the client's anonymized ID; and determining, based on the client's anonymized ID, a client's evaluation score of the client of the recipient entity; and transmitting the client's evaluation score to the server of the sender entity, thereby causing the server of the sender entity to allow or reject the transaction request between the sender and recipient entities based on the client's evaluation score.

In some implementations of the server, the processor is further configured to: store the client's evaluation score in a shared database of clients' evaluation scores of the server; and in response to receiving an additional information about the transaction request from the server of the sender entity: update, based on the additional information, the client's evaluation score of the client associated with the client's anonymized ID; and save the updated client's evaluation score in the shared database of clients' evaluation scores of the server.

In some implementations of the server, during the first stage, the processor is further configured to divide the servers of the plurality of subscriber entities into subgroups of servers.

In some implementations of the server, to divide the servers of the plurality of subscriber entities into the subgroups, the processor is configured to execute a script.

In some implementations of the server, wherein to execute the script, the processor is configured to: transmit the script to the server of the sender entity, thereby causing the server of the sender entity to execute the script; and receive, from the server of the sender entity, a response triggered by executing the script, the response being indicative of how the servers of the plurality of subscriber entities have been divided into the subgroups.

In some implementations of the server, the processor is further configured to select, in each subgroup of the subgroups of servers, at least one anonymizing entity server.

In some implementations of the server, to select the at least one anonymizing entity server, the processor is configured to execute an other script.

In some implementations of the server, to execute the other script, the processor is configured to: transmit the other script to the server of the sender entity, thereby causing the server of the sender entity to execute the other script; and receive, from the server of the sender entity, a response triggered by executing the other script, the response being indicative of which server in each subgroup of the subgroups of servers has been selected as the at least one anonymizing server.

In some implementations of the server, to receive the data indicative of the configuration of each one of the plurality of subscriber entities, the processor is configured to receive, from each one of the plurality of subscriber entities, clients' anonymized IDs and evaluation scores of clients of each one of the plurality of subscriber entities.

In some implementations of the server, the processor is further configured to assign the clients' anonymized IDs with respective ones of clients' evaluation scores received from a respective subscriber entity.

In some implementations of the server, during the first stage, the processor is further configured to create a shared database of the clients' evaluation scores based on the received clients' anonymized IDs and evaluation scores, the shared database of clients' evaluation scores being configured to store at least one of: the client's anonymized IDs; the client's evaluation scores that are associated with the client's anonymized ID; non-subscriber entity IDs; and subscriber entity IDs.

In some implementations of the server, the processor is further configured to receive at least one redundant client's anonymized ID associated with the client's anonymized ID,
    both the client's anonymized ID and at least one redundant client's anonymized ID being associated with a same client; and
    the at least one redundant client's anonymized ID being similar to the client's anonymized ID.

In some implementations of the server, the processor is configured to receive the at least one redundant client's ID in response to at least one additional request to the anonymizing entity server.

In some implementations of the server, the processor is configured to trigger the at least one additional request.

In some implementations of the server, to combine the first portion of the client's anonymized ID with the second portion of the client's anonymized ID, the processor is configured to concatenate the first second portions of the client's anonymized ID.

In some implementations of the server, the processor is configured to execute the first stage prior to the second stage.

In some implementations of the server, the processor is configured to execute the first stage and the second stage at least partially concurrently.

In the context of the present specification, the terms "network resource" and "web resource", unless specified otherwise, denote any element or a combination of elements of the World Wide Web that can potentially be accessible through the Internet. Even if an element is stored in an encrypted form and on a closed server, it is potentially accessible; therefore, it also comprises a network resource. Within the context of this description, the terms "network resource" and "web resource" further denote any data or data set that can be supplied through the network and are associated with the network resource address. Non-limiting examples of the network resources are HTML pages, documents, images, video recordings, news feeds or the combinations of the above files. The network resources can include content, e.g., words, phrases, images etc. and/or integrated information, e.g., meta data, hyperlinks and/or integrated instructions (e.g., JavaScript scenarios).

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Further, in the context of the present specification, unless expressly specified otherwise, the below-listed terms denote as follows:
    a client's ID is a unique combination of numbers, letters, characters that enables to identify the client, e.g., a client's account detail;
    a client's anonymized ID is an anonymized form of the client's ID that is stored on a coordinating server and associated with a client's evaluation score. The anonymized ID can be generated on a server of a subscriber entity and is a random sequence of symbols;
    a subscriber entity is an entity that is a part of a system for anonymized evaluation of clients of entities for processing transactions therebetween;
    a coordinating server is a computing device that stores a shared database of the clients' evaluation scores;
    a database of clients' primary evaluation scores is a database of clients that is hosted on the server of a given subscriber entity and serves as a basis for creating a shared database of clients' evaluation scores on the coordinating server;
    a shared database of clients' evaluation scores is a database that is hosted on the coordinating server and is configured to store the anonymized IDs and evaluation scores of clients of a plurality of entities
    a database for anonymizing the clients' IDs is a database that is hosted on the server of the subscriber entity and is configured to store a plurality of the clients' IDs, where each client's ID is associated with the client's anonymized ID; and a database of details of the subscriber entities is a database that is hosted on the coordinating server and is configured to store an information about details of the subscriber entities.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

DETAILED DESCRIPTION

The following detailed description is provided to enable a person skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Non-limiting embodiments of the present technology are directed to processing transactions between various entities.

Figure 1A:
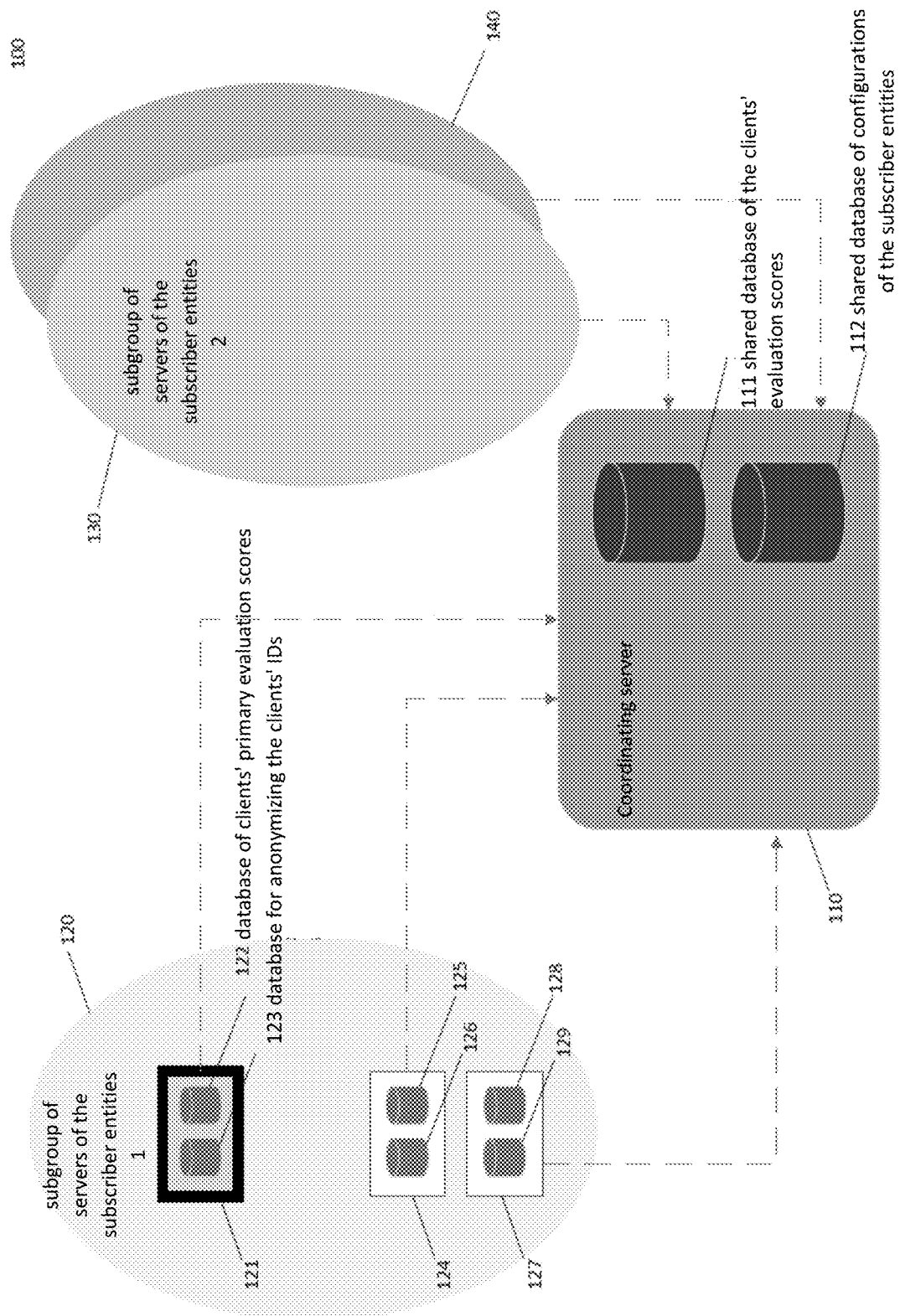
FIG. 1A depicts a schematic diagram of an example embodiment of a system for processing transactions between entities, in accordance with certain non-limiting embodiments of the present technology.

FIG. 1A illustrates a schematic diagram of a system 100 for processing transactions between entities, in accordance with certain non-limiting embodiments of the present technology. The system 100 comprises a coordinating server 110 of a company that provides services for evaluating clients and processing transaction therebetween, and subscriber servers 121, 124, 127 of the subscriber entities which have subscribed to the company associated with the coordinating server 110 for receiving these services. In some non-limiting embodiments of the present technology, the system 100 can be configured to determine evaluation scores of the clients. The system 100 can further assign each client with a respective evaluation score. According to certain non-limiting embodiments of the present technology, the respective evaluation score is a score that characterizes a parameter which the services receiving entity is interested in, e.g., the evaluation score may be expressed as a credit rating score, a score indicative of a client's trustworthiness that is calculated, for example, as a likelihood that this client is a fraudster. The system 100 enables to store and dynamically update the client's evaluation scores on the coordinating server 110 of the company.

Figure 6:
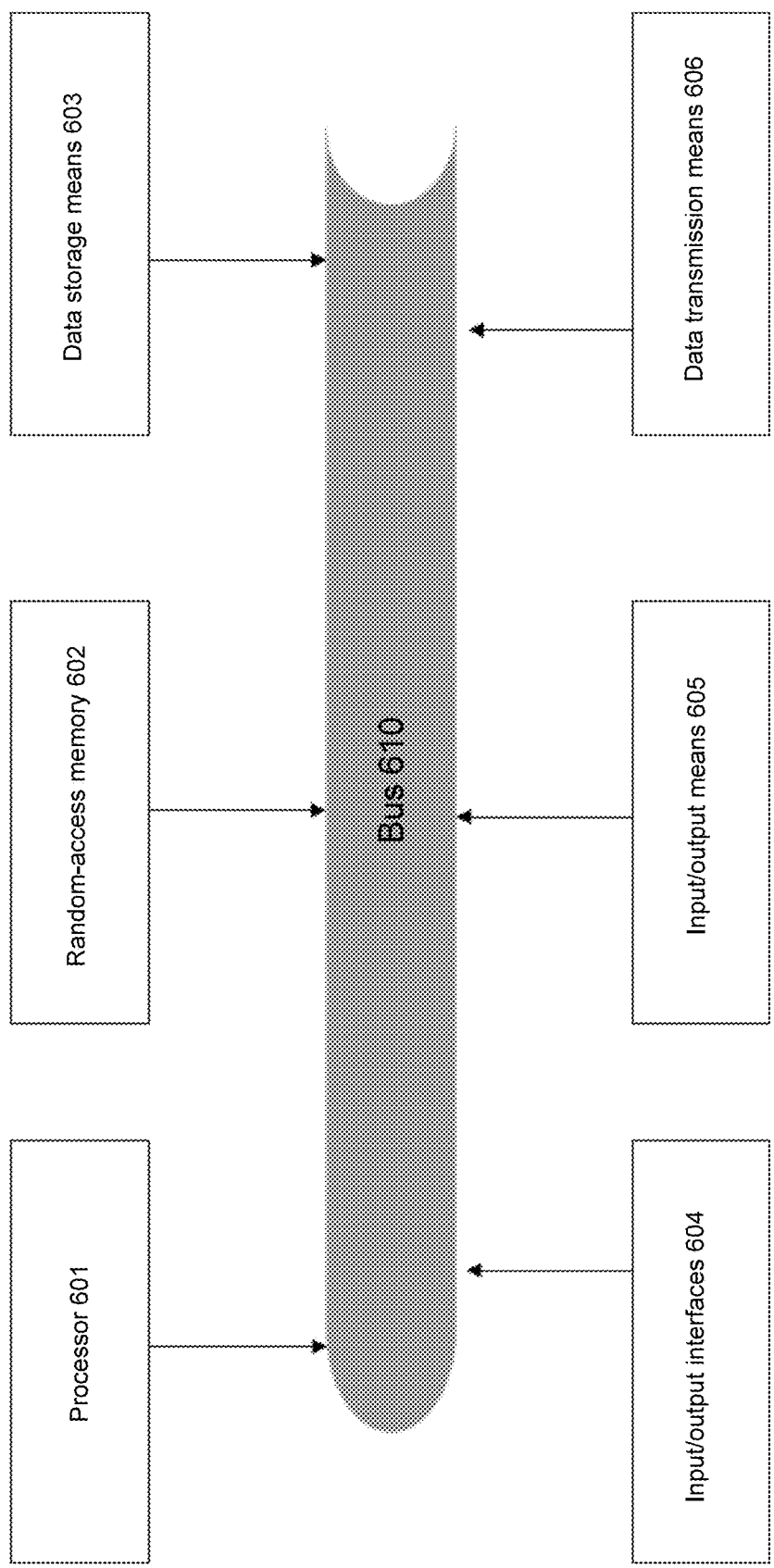
FIG. 6 depicts a schematic diagram of an example computing environment configurable for execution of the stages of the present method of FIGS. 2, 3A, and 3B, in accordance with certain non-limiting embodiments of the present technology.

Further, each one of the coordinating server 110 and each one of the subscriber servers 121, 124, 127 can be implemented as a conventional computer server and may comprise some or all of the components of a computing environment 600 schematically depicted in FIG. 6. In a specific non-limiting example, a given one of the coordinating server 110 and each one of the subscriber servers 121, 124, 127 is implemented as a Dell™ PowerEdge™ Server running the Microsoft™ Windows Server™ operating system but can also be implemented in any other suitable hardware, software, and/or firmware, or a combination thereof. In the depicted non-limiting embodiments of the present technology, the given one of the coordinating server 110 and each one of the subscriber servers 121, 124, 127 is a single server. In alternative non-limiting embodiments of the present technology (not depicted), the functionality of the given one of the coordinating server 110 and each one of the subscriber servers 121, 124, 127 may be distributed and may be implemented via multiple servers.

Further, according to certain non-limiting embodiments of the present technology, each of the subscriber servers 121, 124, 127 has at least two databases: a first respective database 122, 125, 128 of clients' primary evaluation scores and a second respective database 123, 125, 129 for anonymizing clients' IDs. The coordinating server 110 also stores at least two databases: a first shared database 111 of the clients' evaluation scores and a second shared database 112 of configurations of subscriber entities.

According to certain non-limiting embodiments of the present technology, in the system 100, each of the subscriber servers 121, 124, 127 is assigned to a first subgroup 120 of servers of the subscriber entities. Besides the subgroup 120 of servers, FIG. 1A illustrates another two subgroups 130, 140 of servers of the subscriber entities.

According to certain non-limiting embodiments of the present technology, the coordinating server 110 of the company can be configured to receive data of the clients of the entities, stored and updated in an anonymized form. At the same time, employees of the company do not have any technical possibility to deanonymize the data stored on the coordinating server 110 on their own. Deanonymization of the data is performed on the subscriber servers such as subscriber servers 121, 124, 127 of the subscriber entities that the services from the company associated with the coordinating server 110. In other words, the entities having the deanonymizing servers are called subscriber entities.

In order to protect the clients' data against compromising during transmission within the system and storage on the coordinating server 110, an encryption is performed in addition to the anonymization. According to certain non-limiting embodiments of the present technology, the subscriber servers 121, 124, 127 of the subscriber entities can be configured to encrypt the clients' data of respective clients of the subscriber entities prior to the transmission of the clients' data via the coordinating server 110 of the company. However, in spite of the fact that the encryption is performed on the subscriber servers 121, 124, 127 of the subscriber entities, the employees of the subscriber entities do not have any possibility to decrypt and to deanonymize the clients' data of other entities stored on the coordinating server 110, since the data of all the clients are stored in the anonymized form.

Further, in some non-limiting embodiments of the present technology, on the subscriber servers 121, 124, 127, the data of each of the clients is associated with a unique client ID that enables to identify the client. In the system 100, each unique client's ID is assigned with a client's anonymized ID. The client's anonymized ID is also unique, i.e., it corresponds to a single client only and it cannot be duplicated for several clients in the system 100. The clients' anonymized IDs are stored on the coordinating server 110. The client's anonymized ID is used for collecting, analyzing, storing and updating a data of the clients of the system. The data of the clients of the system 100 means the client's anonymized ID and the clients' respective evaluation scores. A given client in the system 100 can be identified using the respective client's anonymized ID only by the entity that has generated the client's anonymized ID for the unique client's ID, i.e., by subscriber server the respective subscriber entity, where the client currently receives the services.

If the entity of the given client does not belong to the system 100, i.e., the entity is not the subscriber entity, the client's anonymized ID will be generated on one of the subscriber servers of certain subscriber entities. To this end, an information about a match between the unique client's ID and the client's anonymized ID is divided between certain subscriber servers of the subscriber entities and none of these subscriber entities can deanonymize the given client individually.

Security of the data of the clients is provided, from one hand, by storing and processing the data in the anonymized form on the coordinating server 110 of the company that is not capable of deanonymizing the data by itself. On the other hand, the data security is further provided by the subscriber entities which perform the deanonymization on their own using their servers such as 121, 124, 127, and the subscriber entities also cannot deanonymize the data of the clients of other entities on their own. Such division may enable to provide sufficient data security minimizing risks of leakage thereof. In order to compromise at least a small part of the data stored on the coordinating server 110, fraudsters have to compromise several actors of the system 100, that is at least one of the subscriber servers 121, 124, 127, which is much more difficult than to compromise a server of a single entity.

Let's consider the following example. A company "G" is associated with the coordinating server 110 that stores evaluation scores of clients of various non-subscriber entities. There are at least two subscriber entities in the system 100 that are associated with the subscriber servers 121, 124, respectively, for example. A first subscriber entity is a bank "A", and a second subscriber entity is a bank "B". The clients' evaluation scores are stored on the coordinating server 110 of the company in the anonymized form, i.e., employees of the company "G" who have access to the coordinating server 110 cannot identify the clients of the banks "A" and "B" and determine which evaluation scores relate to which clients. It is also impossible to compare the "client—evaluation" data from any subscriber server of the banks. The accessibility to the data is distributed between the system's actors. Therefore, if the fraudsters would like to gain access to at least the part of the data, they would need to compromise several servers of the system's actors.

Figure 1B:
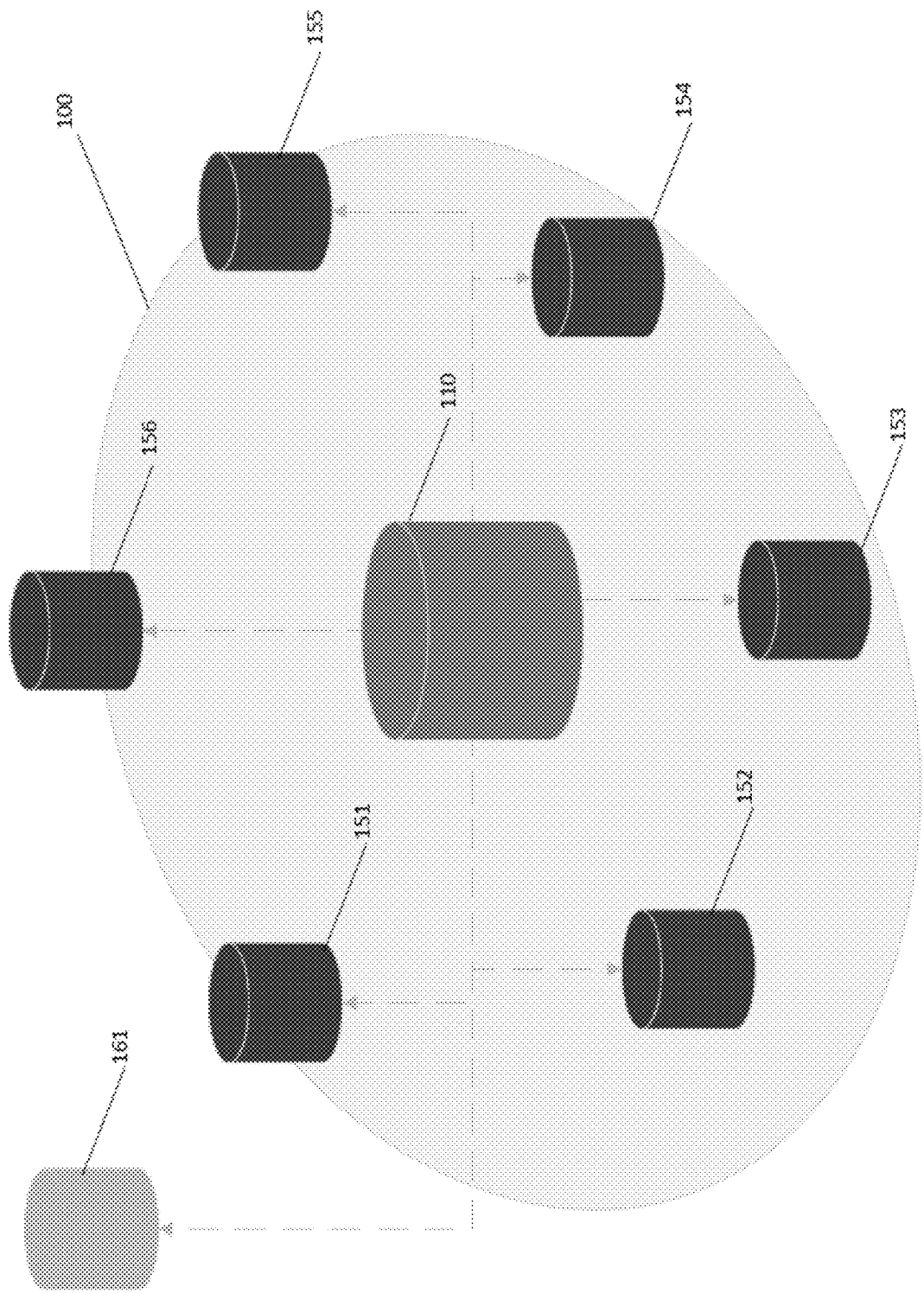
FIG. 1B illustrates a general schematic diagram of the system for processing transactions between entities, in accordance with certain non-limiting embodiments of the present technology.

With reference to FIG. 1B, there is depicted a general schematic diagram of the system 100 for processing the transactions between the entities, in accordance with certain non-limiting embodiments of the present technology. FIG. 1B illustrates the system 100 and the subscriber servers 151, 152, 153, 154, 155, 156 (some of which can be equated with the subscriber servers 121, 124, 127 of FIG. 1A) of the subscriber entities that relate thereto. As well as a non-subscriber server 161 of a non-subscriber entity. According to certain non-limiting embodiments of the present technology, each of the subscriber servers 151, 152, 153, 154, 155, 156 can be configured to apply an asymmetrical encryption algorithm to ensure the anonymity of the data of the clients. In case of the asymmetrical encryption, if a given subscriber server 151 is a sender entity of a given transaction, according to certain non-limiting embodiments of the present technology, the given subscriber server 151 can be configured to perform the data encryption using a public key that is accessible to all entities in the system 100. Further, an other subscriber server 152 of a recipient entity of the given transaction can be configured to perform decryption of the received encrypted data using a private key. The public key is accessible to all entities, while the private key is accessible to the recipient only. The data may be decrypted using the private key only.

The given subscriber server 151 of the sender entity can be configured to encrypt a recipient entity client's ID using the public key of the recipient entity and transmit the encrypted recipient entity client's ID to the coordinating server 110. Further, the coordinating server 110 is configured to receive the encrypted recipient entity client's ID, but they do not have any technical possibility to decrypt it, since they do not have any access to the private key that is stored only at the other subscriber server 152 of the recipient entity.

Referring back to FIG. 1A, let it be assumed that the server of the sender entity is a first subscriber server 121, while the server of the recipient entity is a second subscriber server 124. In order to decrypt and to obtain the anonymized ID, the encrypted ID is transmitted to the other subscriber server 152 of the recipient entity. The client's ID is decrypted on the other subscriber server 152 of the recipient entity using the private key, thereby identifying the client. A database for anonymizing the clients' IDs is stored on the other subscriber server 152 of the recipient entity, the database is not illustrated in FIG. 1B, while it is illustrated in FIG. 1A at 123 where clients' unique IDs correspond to respective clients' anonymized IDs. By referring to the database for anonymizing the clients' IDs, the client's anonymized ID is determined on the other subscriber server 152 of the recipient entity. The recipient's anonymized ID is transmitted from the other subscriber server 152 of the recipient entity to the coordinating server 110. The client's evaluation score that matches to the received anonymized ID is found on the coordinating server 110, and this evaluation score is returned to the given subscriber server 151 of the sender entity. Therefore, the given subscriber server 151 of the sender entity can be configured to obtain the recipient entity client's evaluation score, while the coordinating server 110 does not have any technical possibility to identify the client of the recipient entity using the database of evaluation scores, since the coordinating server 110 has access to the anonymized IDs only.

According to the illustrated example, the sender entity is the bank "A", and the recipient entity is the bank "B". In order to get the evaluation score of the client of the bank "B", the given subscriber server 151 of the bank "A" can be configured to send a request to the coordinating server 110 of the company. This request comprises the client's details of the bank "B" which are encrypted using the public key of the bank "B". Further, the coordinating server 110 can be configured to transmit the request i to the other subscriber server 152 of the bank "B". The client's details are decrypted on the server 152 of the bank "B" using the private key of the bank "B" and the client's anonymized ID is identified. The client's anonymized ID is transmitted from the other subscriber server 152 of the bank "B" to the coordinating server 110 of the company. Thus, the coordinating server 110 can be configured to determine the client's evaluation score using the anonymized ID and transmit it to the given subscriber server 151 of the bank "A".

It will be obvious for the skilled artisan that the coordinating server 110 can be configured to aggregate the client's evaluation scores which correspond to different IDs of the same client in different entities. In this way, it is possible to obtain the evaluation not only for a specific client's detail, but also for a combination of the client's details in different entities, thereby allowing determining a more holistic score about the client's trustworthiness. According to certain non-limiting embodiments of the present technology, the coordinating server 110 can be configured to compare the anonymized IDs which correspond to the details of the same client in different entities may be compared to each other using information about client's computing device used for authentication. Also, when performing the transactions from one entity (such as a bank) to another one, usually, the server of the entity can be configured to save the information if the transaction was made from an account of one client to an account of the same client in another bank. Such kind of information may be stored on the coordinating server 110 and used to compare the anonymized IDs which correspond to the client details in different entities.

According to other non-limiting embodiments of the present technology, the recipient client's ID may be anonymized on several servers of the subscriber entities, rather than on the server of the recipient entity. In this case, the recipient client's ID can be divided into several portions. Each of the subscriber servers of the subscriber entities which perform the anonymization will receive only a respective portion of the client's ID and none of these subscriber servers will be able to perform the deanonymization individually.

According to yet other non-limiting embodiments of the present technology, the system 100 enables the subscriber entities to request the client's evaluation scores not only for the clients of another subscriber entity, but also of any other non-subscriber entity, that is not coupled to the system 100. In this case, the given subscriber server 151 of the sender entity can be configured to divide the client's ID is into several portions and further send to the coordinating server 110 in several respective requests. Further, the coordinating server 110 can be configured to transmit each of these requests to the subscriber servers 153, 154 of different subscriber entities in order to decrypt the anonymization. The separated encryption and anonymization of the client's ID on the subscriber servers 153, 154 of the subscriber entities enable to provide the anonymity of the client's data. An example of this method is described below.

Let's consider an example of anonymization of the client's data of the non-subscriber entity. The bank "A" is both the subscriber entity and the sender, and the given subscriber server 151 corresponds to the bank "A". While a bank "C" is both a non-subscriber entity and the recipient entity, and a non-subscriber server 161 corresponds thereto. The data of the client of the bank "C" can be anonymized on the servers 153, 154 of two subscriber entities. According to one of embodiments, the sender bank may be one of two subscriber entities which will then perform the anonymization. In some non-limiting embodiments of the present technology, the anonymization may be performed in two other subscriber entities, where none of the subscriber entities are the sender bank. In this regard, a request comprising details of the client of the bank "C" is sent from the given subscriber server 151 of the bank "A" to the coordinating server 110. Therewith, the details of the client of the bank "C" are divided into two parts, and a first part is encrypted using a public key of the bank "B", while a second part is encrypted using a public key of yet another bank, bank "D". The request is received on the coordinating server 110 and the first encrypted part is transmitted to the subscriber server 153 of the bank "B" for decryption and anonymization, while the second encrypted part is transmitted to the subscriber server 154 of the bank "D". When the first part of the details is received on the subscriber server 153 of the bank "B", it is decrypted using a respective private key and anonymized, thereby obtaining a first part of the client's anonymized ID. When the second part of the details is received on the subscriber server 154 of the bank "D", it is decrypted using the respective private key of the bank and anonymized, thereby obtaining a second part of the client's anonymized ID. The first part of the anonymized ID is sent from the subscriber server 153 of the bank "B" to the coordinating server 110 of the company, while the second part of the anonymized ID is sent to the coordinating server 110 from the server 154 of the bank "D". When both parts of the client's anonymized ID are received on the coordinating server 110 of the company, the coordinating server 110 can be configured to combine them, thereby obtaining the client's anonymized ID, and thus identify the client's evaluation score in the first shared database 111 of clients' evaluation scores, using the client's anonymized ID. In response to the request received previously, the coordinating server 110 can be configured to send the client's evaluation score to the given subscriber server 151 of the bank "A".

According to another embodiment, each of the subscriber servers of the subscriber entities may be configured to apply an anonymizing algorithm to anonymize a given clients' IDs. In some non-limiting embodiments of the present technology, the anonymizing algorithm can comprise a hash anonymizing algorithm. In other non-limiting embodiments of the present technology, the anonymizing algorithm can comprise a symmetric encryption anonymizing algorithm.

According to certain non-limiting embodiments of the present technology, the present method for processing the transaction between entities comprises a preparatory stage 200 and an operational stage 300, which will be described immediately above with reference to FIGS. 2 and 3A-B, respectively.

Figure 2:
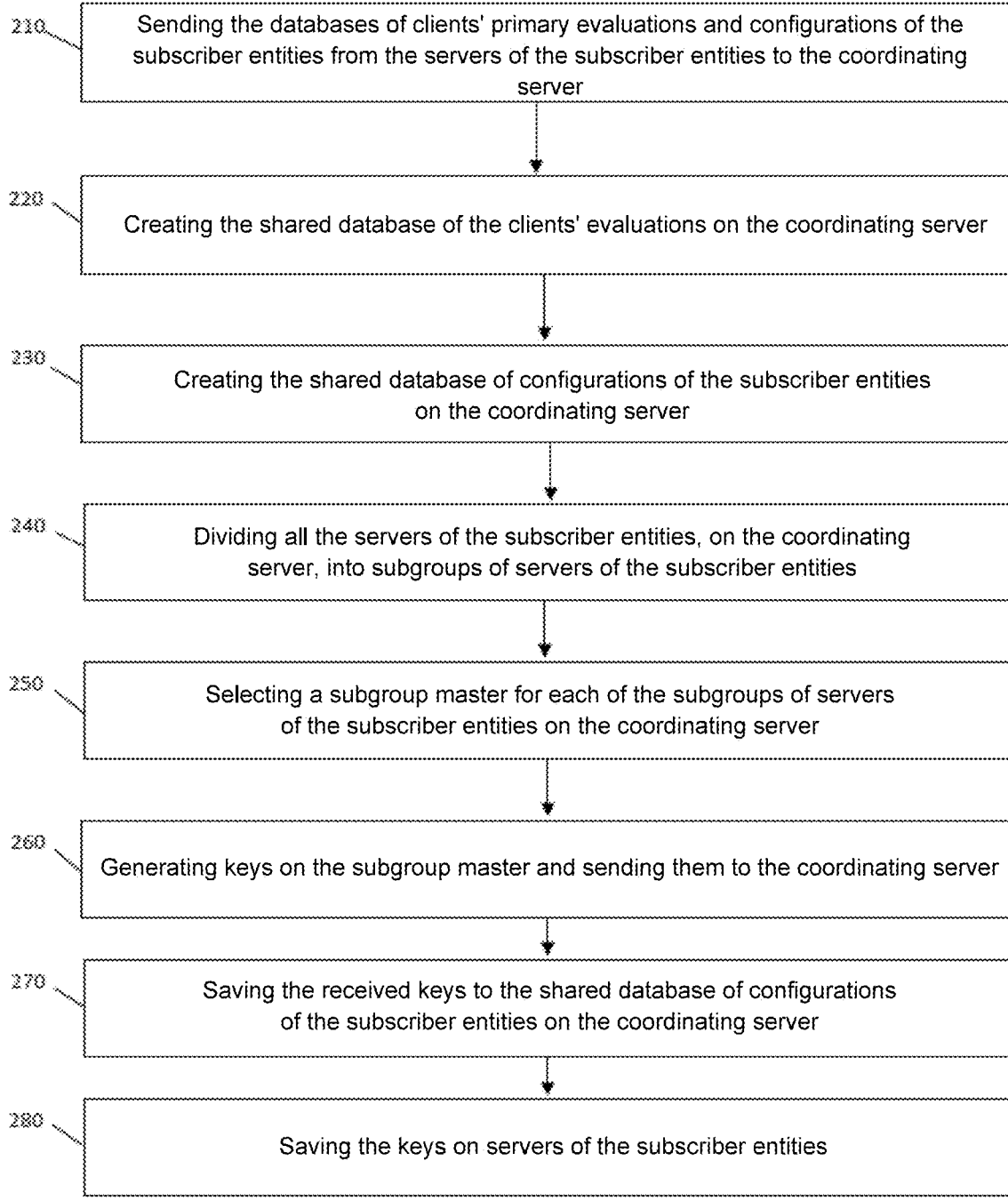
FIG. 2 depicts a flowchart diagram of a preparatory stage of a present method for processing transactions between entities, in accordance with certain non-limiting embodiments of the present technology.

With reference to FIG. 2, there is depicted a flowchart diagram of the preparatory stage 200. The preparatory stage 200 can be executed, for example, by a processor 601 of the coordinating server 110.

Step 210: Sending the Databases of Clients' Primary Evaluations and Configurations of the Subscriber Entities from the Servers of the Subscriber Entities to the Coordinating Server The preparatory stage 200 commences at step 201, with the processor 601 being configured to receive: (1) databases of clients' primary evaluation scores such as the first respective databases 122, 125, 128; and (2) data indicative of configurations of the subscriber entities from the servers of the subscriber entities such as the subscriber servers 121, 124, 127. According to certain non-limiting embodiments of the present technology, the data indicative of configuration of a given subscriber entity comprises a subscriber entity ID of the given subscriber entity, a public key of the given subscriber entity, a list of types and ranges of the clients' IDs (templates of the details) for which this given subscriber entity performs the anonymization, e.g., Bank Identification Numbers (BINS) associated with payment cards etc. Also, in some non-limiting embodiments of the present technology, he data of configurations of the given subscriber entity comprises a resource pointer, where an authenticity of the data can be verified independently of the coordinating server110. According to certain non-limiting embodiments of the present technology, the resource pointer may be either a URL pointing at a file on the subscriber server of the subscriber entity or a pointer to a central register associated with a specific group of entities (such as a central bank register).

In other non-limiting embodiments of the present technology, the second respective databases 122, 125, 128 of the clients' primary evaluation scores are neither prepared nor transmitted to the coordinating server 110 at the preparatory stage 200. In this case, the processor 601 can be configured to receive only data of the configurations of the subscriber entities from the subscriber servers 121, 124, 127 of the subscriber entities.

How the first respective databases122, 125, 128 of the clients' primary evaluations, comprising a plurality of the clients' anonymized IDs of clients corresponding to respective primary evaluation scores of the client's trustworthiness, are prepared, in accordance with certain non-limiting embodiments of the present technology, will now be described.

The first respective databases 122, 125, 128 of the clients' primary evaluation scores such as are generated in advance on the subscriber servers 121, 124, 127 of the subscriber entities. A respective database of clients of each of the subscriber entities (not shown in FIG. 1) is taken as a basis for each of the databases. The respective database of clients is a table, where each of the clients' unique IDs corresponds to his/her data, e.g., surname, name, patronymic, sex, age, account details, and the like, and a client's trustworthiness evaluation score.

For example, in the embodiments where the given subscriber entity is a bank, the respective subscriber server can be configured to determine the client's trustworthiness evaluation score according to known algorithms which are based, without limitation, on at least one of: a money amount on the client's account, an amount of credits, an amount of successfully repaid credits, a history of transactions etc.

Further, according to certain non-limiting embodiments of the present technology, all information, except for the clients' unique IDs and trustworthiness evaluation scores, is deleted from the existing database of the clients of the subscriber entity. Further, the coordinating server 110 can be configured to generate a respective unique anonymized ID, hereinafter referred to as a respective anonymized ID, for each of the clients' unique IDs. According to certain non-limiting embodiments of the present technology, the respective anonymized ID comprises a random set of numbers that is generated using an algorithm for random selection of symbols. A sequence of symbols in the respective anonymized ID is unique for each of the clients.

The generated respective anonymized IDs are matched to each of the clients' unique IDs and stored in a respective database of the clients on each of the subscriber servers 121, 124, 127. Thus, the respective database of the clients comprises a plurality of the clients' unique IDs, a plurality of the anonymized IDs and evaluation scores respectively associated with plurality of the clients' unique IDs.

Further, the respective subscriber server can be configured to delete all the clients' unique IDs a given database of the clients. The respective subscriber server can be configured to save this copy of the given database of the clients subscriber entity as a respective one of the first respective databases22, 125, 128 of the clients' primary evaluation scores. Further, each subscriber server of the subscriber servers 121, 124, 127 can be configured to transmit the so generated first respective databases 122, 125, 128 of the clients' primary evaluation scores to the coordinating server 110.

Further, in some non-limiting embodiments of the present technology, using the respective database clients, the subscriber servers 121, 124, 127 can be configured to generate the second respective databases 123, 126, 129 for anonymizing the clients' IDs. The second respective databases 123, 126, 129 for anonymizing the clients' IDs are generated in the same way as the first respective databases 122, 125, 128 of the clients' primary evaluation scores but comprises the clients' unique IDs and the clients' anonymized IDs respective associated therebetween. At the operational stage 300, the second respective databases 123, 126, 129 for anonymizing the clients' IDs will be used for determining the clients' anonymized IDs on the subscriber servers 121, 124, 127 of the subscriber entities.

The preparatory stage 200 of the present method hence advances to step 220.

Step 220: Creating the Shared Database of the Clients' Evaluations on the Coordinating Server At step 220, according to certain non-limiting embodiments of the present technology, the coordinating server 110 can be configured to receive the data indicative of configurations of the subscriber entities and the first respective databases 122, 125, 128 of the clients' primary evaluation scores from the subscriber servers 121, 124, 127 of the subscriber entities. Further, the coordinating server 110 can be configured to save the data from the first respective databases 122, 125, 128 in the first shared database 111 of the clients' anonymized evaluation scores.

The preparatory stage 200 hence advances to step 230.

Step 230: Creating the Shared Database of Configurations of the Subscriber Entities on the Coordinating Server At step 230, according to certain non-limiting embodiments of the present technology, the coordinating server 110 can be configured to save the data indicative of the configurations of the subscriber entities received at step 220 in the second shared database 112 of configurations of the subscriber entities. According to certain non-limiting embodiments of the present technology, each of the subscriber servers 121, 124, 127 can be configured to have access to the second shared database 112 of configurations of the subscriber entities. Therefore, the configurations of other subscriber entities may be downloaded or updated from each of the subscriber servers such as 121, 124, 127 of the subscriber entities by transmitting that data to the coordinating server 110. After the second shared database 112 of configurations of the subscriber entities is created, the coordinating server 110 can be configured to transmit the second shared database 112 to each one of the subscriber servers 121, 124, 127 of the subscriber entities.

The preparatory stage 200 hence advances to step 240.

Step 240: Dividing all the Servers of the Subscriber Entities, on the Coordinating Server, into Subgroups of Servers of the Subscriber Entities At step 240, according to certain non-limiting embodiments of the present technology, the coordinating server 110 can be configured to divide the subscriber servers 121, 124, 127 of the subscriber entities into subgroups of servers of the subscriber entities such as a first, a second, and a third subgroup 120, 130, 140. For example, in some non-limiting embodiments of the present technology, the coordinating server 110 can be configured to divide the subscriber servers 121, 124, 127 into the first, second, and third subgroups 120, 130, 140 such that there will be no duplications among the subscriber servers of the subscriber entities in each of the first, second, and third subgroups 120, 130, 140.

To execute the division into the first, second, and third subgroups 120, 130, 140 of servers of the subscriber entities, the coordinating server 110 can be configured to execute a preliminarily prepared script. Further, the coordinating server 110 can be configured to save data indicative of the division of the subscriber servers 121, 124, 127 into the first, second, and third A subgroups 120, 130, 140 of servers of the subscriber entities in the second shared database 112 of configurations of the subscriber entities.

The preparatory stage 200 hence advances to step 250.

Step 250: Selecting a Subgroup Master for Each of the Subgroups of Servers of the Subscriber Entities on the Coordinating Server At step 250, according to certain non-limiting embodiments of the present technology, the coordinating server 110 can be configured to select, from each of the first, second, and third subgroups 120, 130, 140, a subgroup master, which is one of the subscriber servers of the respective subgroups. For example, the coordinating server 110 can be configured to select, in the first subgroup 120, the first subscriber server 121 as the subgroup master.

According to certain non-limiting embodiments of the present technology, the subgroup master of each of the first, second, third subgroups 120, 130, 140 can be configured to generate the public and the private keys for the entire respective subgroup of the subscriber entities. To that end, the coordinating server 110 can be configured to send the requests for generating the private and the public keys for the corresponding one of the first, second, third subgroups 120, 130, 140 of servers of the subscriber entities such as the subgroups' masters.

The preparatory stage 200 hence advances to step 260.

Step 260: Generating Keys on the Subgroup Master and Sending them to the Coordinating Server At step 260, according to certain non-limiting embodiments of the present technology, the coordinating server 110 can be configured to cause the subgroups' masters to generate the public and the private key for each of the first, second, third subgroups 120, 130, 140 of servers. Pairs of the generated keys can be saved on the subgroups' masters. Further, the coordinating server 110 can be configured to cause the subgroups' masters to transmit the generated public and private keys for each of the first, second, third subgroups 120, 130, 140 to the coordinating server 110 and receive them.

In some non-limiting embodiments of the present technology, before transmitting to the coordinating server 110, a given subgroup master can be configured to protect a respective pair of private and public keys by encryption. In other non-limiting embodiments of the present technology, the given subgroup master can be configured to transmit the respective pair of private and public keys to the coordinating server 110 via a secured communication channel. Additionally, the given subgroup master can be configured to encrypt both the public key and the private key of the respective subgroup with a private key of the given subgroup master. Thus, the recipients of the public and private keys can be configured to verify whether the subgroup keys were generated by the given subgroup master of servers of the subscriber entities.

In some non-limiting embodiments of the present technology, to encrypt the private key of the respective subgroup of servers of the subscriber entities, the given subgroup master can apply an asymmetric encryption algorithm. Thus, the private key of the respective subgroup of servers of the subscriber entities is encrypted for transmission for several times using the public keys of each of the subscriber entities included into the respective one of the first, second, and third subgroups 120, 130, 140 of the subscriber entities except for the subgroup master. In this case, several encrypted files are sent to the coordinating server, and each of the files is for different servers 124, 127 of the subscriber entities.

The preparatory stage 200 hence advances to step 270.

Step 270: Saving the Received Keys to the Shared Database of Configurations of the Subscriber Entities on the Coordinating Server At step 270, according to certain non-limiting embodiments of the present technology, the coordinating server 110 can be configured to receive pairs of public and the encrypted private keys from the respective subgroups' masters of each one of the first, second, and third subgroups 120, 130, 140. The received keys are saved in the second shared database 112 of configurations of the subscriber entities on the coordinating server 110. And each of the private keys in the second shared database 112 of configurations of the subscriber entities are associated with the subscriber server of the subscriber entity for which this private key is designated. The public keys in the second shared database 112 are associated with the respective subgroups of the first, second, and third subgroups 120, 130, 140.

The preparatory stage 200 hence advances to step 280.

Step 280: Saving the Keys on Servers of the Subscriber Entities

At step 280, the coordinating server 110 can be configured to receive a respective request for downloading the keys of the respective subgroup of servers from each of the subscriber servers 124, 127, except for the subgroup master (such as the first subscriber server 121). In response to each request, the coordinating server 110 can be configured to identify, in the second shared database 112 of configurations of the subscriber entities, the respective public keys corresponding to each of the first, second, third subgroups 120, 130, 140. Also, the encrypted private key that is associated to the server of this subscriber entity is found in the second shared database 112 of configurations of the subscriber entities. Further, the coordinating server 110 can be configured to transmit the identified public and private keys to the subscriber servers 124, 127 of the subscriber entity. Further, the subscriber servers 124, 127 can be configured to save the received public keys. The private keys of the subgroups of servers 120, 130, 140 of the subscriber entities are decrypted using the private keys of the subscriber servers 124, 127 of the subscriber entities. Further, the subscriber servers 124, 127 can be configured to save the decrypted private keys as well.

The preparatory stage 200 of the present method hence terminates. And the present method for processing transactions between entities proceeds to the operational stage 300, a flowchart of which is illustrated in FIGS. 3A and 3B, in accordance with certain non-limiting embodiments of the present technology.

Step 310: The Recipient Entity is the Subscriber Entity

The operational stage 300 starts at step 310 with the coordinating server 110 being configured to receive to receive a transaction request from a server of a sender entity for a transaction between the sender entity and a client of a recipient entity. According to certain non-limiting embodiments of the present technology, the sender entity is a subscriber entity that executes the request for the transaction conduction. In some non-limiting embodiments of the present technology, the transaction request comprises the client's details in the recipient entity and details of the recipient entity itself, as well as a transaction ID. Then, the coordinating server 110 can be configured to determine whether the recipient entity is a subscriber entity or not. To that end, the coordinating server 110 can be configured to compare the details of the recipient entity taken from the transaction request to the details of the subscriber entities in the second shared database 112 of configurations of the subscriber entities that was saved at step 230.

If the recipient entity is a subscriber entity, the operational stage 300 proceeds to step 311. Else, the operational stage 300 proceeds to step 321.

First, there will be provided a description of the operational stage 300 for a scenario where the recipient entity is the subscriber entity.

Step 311: Creating a Request for Obtaining the Evaluation to the on the Server of the Sender Entity At step 311, the server of the sender entity can be configured to: (i) generate, using the data from the transaction request, an evaluation request for obtaining an evaluation score of the client of the recipient entity; and (ii) transmit the request to the coordinating server 110. In some non-limiting embodiments of the present technology, the evaluation request comprises details of the recipient entity, the transaction ID, the client's encrypted ID in the recipient entity. The client's ID may have been encrypted using the public key of the recipient entity. In some non-limiting embodiments of the present technology, the client's ID can be encrypted in such way that it may be decrypted by the server of the recipient entity only, using the respective the private key.

In some non-limiting embodiments of the present technology, the evaluation request may comprise additional data which may be considered during performing the evaluation by the coordinating server 110, e.g., a transfer sign between places of the same physical person, a percentage of the transferred amount taken from an account balance, a session ID in a mobile application or a web-application of the sender entity in order to consider the session evaluation data and other data.

Further, the coordinating server 110 can be configured to receive the evaluation request.

The operational stage 300 hence advances to step 312.
Step 312: Receiving the Request for Obtaining the Evaluation on the Coordinating Server, Determining the Recipient Entity and Transmitting a Request for Anonymizing the Client's Id to the Server of the Recipient Entity At step 312, the coordinating server 110 can be configured to receive the evaluation request. Further, the coordinating server 110 can be configured to retrieve the following data from the evaluation request for obtaining the evaluation: the entity details, the transaction ID, the client's encrypted ID. Using these details of the recipient entity, the coordinating server 110 can be configured to identify data of its configurations in the second shared database 112 of configurations of the subscriber entities, including, for example, without limitations, an IP-address of the server of the recipient entity, the transaction ID.

Further, in some non-limiting embodiments of the present technology, the coordinating server 110 can be configured to: (i) generate an anonymizing request for anonymizing the client's ID; and (ii) send the anonymizing request to the server of the recipient entity. According to certain non-limiting embodiments of the present technology, the anonymizing request can comprise the client's encrypted ID and the IP-address of the server of the recipient entity.

The operational stage 300 hence advances to step 313.
Step 313: Receiving the Request for Anonymizing on the Server of the Recipient Entity At step 313, having received the anonymizing request for anonymizing the client's ID from the coordinating server 110, according to certain non-limiting embodiments of the present technology, the server of the recipient entity can be caused, by the coordinating server 110, to (i) retrieve the client's encrypted ID from the anonymizing request; and (ii) decrypt the client's encrypted ID using the private key of the recipient entity, thereby generating the client's ID. The decryption may be performed by any standard asymmetric decryption method, as an example.

The operational stage 300 hence advances to step 314.
Step 314: Performing the Anonymization on the Server of the Recipient Entity and Transmitting the Client's Anonymized Id to the Coordinating Server At step 314, the server of the recipient entity can be configured to: (i) determine the client's anonymized ID using the recipient ID in the first respective database for anonymizing the clients' IDs; and (ii) transmit the client's anonymized ID to the coordinating server 110 in response to the anonymizing request for the client's ID therefrom received at step 313.

The operational stage 300 for the scenario where the recipient entity is the subscriber entity hence advances to step 330, which is common for both scenarios and will be described further below with reference to FIG. 3B Now, there will be provided a description of the operational stage 300 for a scenario where the recipient entity is a non-subscriber entity.
Step 321: Determining, which Subgroups of Servers of the Subscriber Entities Will Perform the Deanonymization At step 321, according to certain non-limiting embodiments of the present technology, anonymizing servers of the subscriber entities, where the anonymization of the recipient client's ID will be performed, are determined. In some non-limiting embodiments of the present technology, the coordinating server 110 can be configured to determine anonymizing servers. In other non-limiting embodiments of the present technology, the server of the sender entity can be configured to determine anonymizing servers and further send data indicative of such determination to the coordinating server 110.

To that end, in some non-limiting embodiments of the present technology, for example, the coordinating server 110, can be configured execute a predetermined script configured to identify, in the subscriber entities, the anonymizing servers. When selecting the anonymizing servers, the predetermined script may be configured to consider parameters of the client's ID such as a value, a number of symbols etc.

To this end, firstly, the coordinating server 110 can be configured to select several subgroups of servers of the subscriber entities, and then select a respective anonymizing server from each of the selected subgroup of servers of the subscriber entities.

In the embodiments where the server of the sender entity is configured to determine the anonymizing servers, the server of the sender entity can be preliminary configured to download the predetermined script from the coordinating server 110 for further execution of the predetermined script at the server of the sender entity. In some non-limiting embodiments of the present technology, two subgroups of servers of the subscriber entities can be selected using the script. In other non-limiting embodiments of the present technology, more than two subgroups of servers of the subscriber entities can be selected.

Hereinafter, for the sake of simplicity, the description will be provided for the embodiments where the coordinating server 110 is configured to execute the predetermined script for selecting two subgroups of servers of the subscriber entities. However, as noted hereinabove, in other non-limiting embodiments of the present technology, identifying the subgroups of servers can be executed by the server of the sender entity without departing from the scope if the present technology.

The operational stage 300 hence advances to step 322.

Step 322: Forming a Request(s) on the Server of the Sender Entity and Transmitting it (them) to the Coordinating Server At step 322, according to certain non-limiting embodiments of the present technology, the coordinating server 110 can be configured to retrieve the client's ID, the session ID, the transaction ID, the recipient entity details from the transaction request. Further, the coordinating server 110 can be configured to generate two evaluation requests. At the same time, before generating the requests, the coordinating server 110 can be configured to divide the client's ID into two parts: a first part of the client's ID and a second part of the client's ID. The division into two parts may be performed in any known way, e.g., a hash of all uneven symbols from the client's ID may be used for the first part of the ID, while a hash of all even symbols from the client's ID may be used for the second part of the client's ID. For example:

The client's ID="+79680148862", then:
the first part of the client's ID=hash("+98186"), i.e., the hash of all uneven symbols of the client's ID,
the second part of the client's ID=hash("760482"), i.e., the hash of all even symbols of the client's ID.

According to certain non-limiting embodiments of the present technology, each of the evaluation requests comprises the transaction ID, the ID of the subgroup of servers of the subscriber entities, the encrypted part of the client's ID of the recipient entity. In some non-limiting embodiments of the present technology, the evaluation requests can differ in the encryption of the client's ID of the recipient entity. For the first evaluation request, the coordinating server 110 can be configured to encrypt the first part of the client's ID is using the public key of the first selected subgroup of servers of the subscriber entities. For the second evaluation request, the coordinating server 110 can be configured to encrypt the second part of the client's ID is using the public key of the second selected subgroup of servers of the subscriber entities.

In those embodiments where the evaluation requests are generated by the server of the sender entity, after generating the evaluation requests as mentioned above, the server of the sender entity can further be configured to transmit both evaluation requests to the coordinating server 110.

According to some non-limiting embodiments of the present technology, in order to achieve greater reliability at step 322, during the generation of the evaluation request, a value of a general function of the hash value is sent, besides the encrypted first part of the recipient detail. For example, if the initial detail is "+79680148862", then the first part of the detail may look like "+98186", and the value of the general function of the hash value is sha256(""+98186")= 294fe3b55de4f271e15e2086d88b55a152c0c88b6e1c87136 2cace2b81f75c21, may be determined as a number of digits in a row representation of the encrypted first part of the ID, i.e., 41. In this case, using the obtained value of the general function of the hash value of the first part of the ID, at step 323, a given anonymizing server from the respective subgroup of servers is selected by the coordinating server 110 to obtain redundant parts of the anonymized IDs for ensuring a fault tolerance of the present method.

The operational stage 300 hence advances to step 323.

Step 323: Receiving the Request(s) for Obtaining the Evaluation on the Coordinating Server and Forming Two Requests for Anonymizing At step 323, the coordinating server 110 can be configured to receive (or otherwise generate) both evaluation requests According to certain non-limiting embodiments of the present technology, one anonymized ID may correspond to one client in the first shared database 111 of the clients' IDs. In other non-limiting embodiments of the present technology, several anonymized IDs may correspond to one client, i.e., some clients, e.g., the clients of the non-subscriber entities may have redundant anonymized IDs. If there is at least one redundant anonymized IDs that correspond to the same client, all the anonymized IDs of this client are cross associated between each other. The redundant anonymized IDs of the same client of the non-subscriber entity allows to anonymize the ID on the servers of different subscriber entities. In this way, at step 323, the coordinating server 110 may send each of the encrypted parts to the subscriber servers of several entities of the same subgroup of servers of the subscriber entities in order to achieve the redundancy for a case of unavailability of one of the entities of this subgroup that has previously participated in anonymization of this part of the detail.

Using the ID of the subgroup of subscriber servers of the subscriber entities from the first evaluation request, the coordinating server 110 can be configured to identify a first anonymizing entity server the second shared database 112 of configurations of the subscriber entities. In some non-limiting embodiments of the present technology, the first anonymizing entity is a first available entity of the first subgroup of servers of the subscriber entities.

Further, in some non-limiting embodiments of the present technology, the coordinating server 110 can be configured to generate a first anonymizing request for anonymizing the client's ID, including the first part of the client's ID that is encrypted using the public key of the first subgroup of servers of the subscriber entities selected at step 321. Further, the coordinating server 110 can be configured to save, in its memory, the first anonymizing request. Similarly, the coordinating server 110 can be configured to generate a second request for anonymizing the client's ID based on the second part thereof. For the second anonymizing request for the client's ID, the coordinating server 110 can be configured to identify a second anonymizing entity server in the second subgroup of servers of the subscriber entities. Simi larly, the coordinating server 110 can be configured to save, in its memory, the second anonymizing request.

The operational stage 300 hence advances to step 324.

Step 324: Sending the First Request for Anonymizing to the Server of the First Anonymizing Entity Among the First Subgroup of Servers of the Subscriber Entities At step 324, the coordinating server 110 can be configured to transmit first anonymizing request generated at step 323 to the first anonymizing entity servers of the first anonymizing entity of the first subgroup of servers of the subscriber entities.

The operational stage 300 hence advances to step 325.

Step 325: Performing the Anonymization on the Server of the First Anonymizing Entity and Transmitting the First Part of the Anonymized Id to the Coordinating Server At step 325, the first anonymizing entity server can be configured to receive the first anonymizing request. Further, the first anonymizing entity server can be configured to decrypt the first part of the encrypted client's ID from the first anonymizing request using the private key of the first subgroup of servers of the subscriber entities, thereby determining the first part of the client's ID.

Further, the first anonymizing entity server can be configured to anonymize the first part of the client's ID is anonymized using, for example, a unique anonymization key. In some non-limiting embodiments of the present technology, the first anonymizing entity server can be configured to generate the first part of the anonymized client's ID by applying a hashing algorithm to a combination of the first part of the client's ID and the unique anonymization key that acts as "a secret salt". Other embodiments of the anonymization may include, for example, using a symmetric encryption algorithm.

According to other non-limiting embodiments of the present technology, the first anonymizing entity server can be configured to generate the first part of the anonymized ID using, for example, a script for generating random numbers.

Finally, the first anonymizing entity server can be configured to transmit the first part of the client's anonymized ID to the coordinating server 110.

The operational stage 300 hence advances to step 326.

Step 326: Sending the Second Request to the Server of the Second Anonymizing Entity Among the Second Subgroup of Servers of the Subscriber Entities Step 327: Performing the Anonymization on the Server of the Second Anonymizing Entity and Transmitting the Second Part of the Anonymized Id to the Coordinating Server At steps 326 and 327, the coordinating server 110 can be configured to transmit the second anonymizing request including the second part of the encrypted client's ID to the second anonymizing entity server, thereby causing the second anonymizing entity server to generate the second part of the anonymized ID, which is executed in a similar manner as generating the first part of the anonymized ID described above at steps 324 and 325.

Further, the second anonymizing entity server can be configured to transmit the second part of the client's anonymized ID to the coordinating server 110.

According to other non-limiting embodiments of the present technology, several anonymizing entities create several equivalent copies of the anonymized ID, and they are called as redundant anonymized IDs. The redundant anonymized IDs are identical to the client's anonymized ID and ensure the operation fault tolerance of the present method. When performing this method, the anonymization may be performed on different anonymizing entity servers.

A subgroup key may be additionally used for the anonymization. The subgroup key is a single key for anonymization that is divided between the subgroup of servers of the subscriber entities.

The operational stage 300 hence advances to step 328.

Step 328: Combining the First Part and the Second Part of the Anonymized Id on the Coordinating Server and Obtaining the Client's Anonymized Id At step 328, the coordinating server 110 can be configured to: (i) receive the first part and the second part of the client's anonymized ID; and (ii) combine the first part and the second part of the client's anonymized ID, e.g., using concatenation, thereby generating the client's anonymized ID.

The operational stage 300 hence advances to steps 330 to 360, which are common to both scenarios, where the recipient entity is the subscriber and non-subscriber entity, and description of which will be provided immediately below with reference to FIG. 3B.

Step 330: Identifying the Evaluation that Corresponds to the Anonymized Id on the Coordinating Server At step 330, using the client's anonymized ID, the coordinating server 110 can be configured to identify the client's evaluation score of the client of the recipient entity in the first shared database 111 of the clients' evaluation scores.

The operational stage 300 hence advances to step 340.

Step 340: Sending the Anonymized Evaluation to the Sender Entity

At step 340, the coordinating serve 110 can be configured to transmit the client's anonymized evaluation of the recipient entity to the server of the sender entity in response to the request for obtaining the evaluation score.

The operational stage 300 hence advances to step 350.

Step 350: In Response to the Receipt of the Additional Data According to the Request, Updating the Evaluation that Corresponds to the User's Anonymized Id At step 350, in some non-limiting embodiments of the present technology, the server of the sender entity can receive additional client data. For example, the additional data can be a fraud compliant. In this case, the server of the sender entity can be configured to generate and further send a request to the coordinating server 110 for updating the client's evaluation score of the recipient entity. The request for updating the evaluation score can comprise the transaction ID and the additional data. Also, the request for updating the evaluation score may comprise the transaction ID, the recipient client's ID, for which the fraud compliant has been received.

The operational stage 300 hence advances to step 360.

Step 360: Saving the Updated Evaluation in the Database on the Coordinating Server At step 360, the coordinating server 110 can be configured to (i) receive, from the server of the sender entity, the request for updating the evaluation score; (ii) retrieve the transaction ID from the request; and (iii) identify, based on the transaction ID, the client's anonymized ID. Also, in some non-limiting embodiments of the present technology, the coordinating server 110 can be configured to conduct an analysis of the data obtained in the request for updating the evaluation score to confirm or to deny a fraud fact from the side of the recipient entity with a certain likelihood degree. And if the fraud fact from the side of the client of the recipient entity is confirmed, the coordinating server 110 can further be configured to save the updated client's evaluation score that corresponds to the client's anonymized ID in the first shared database 111 of the clients' evaluation scores.

The operational stage 300 hence terminates.

In some non-limiting embodiments of the present technology, steps 350 and 360 may be omitted.

Figure 3A:
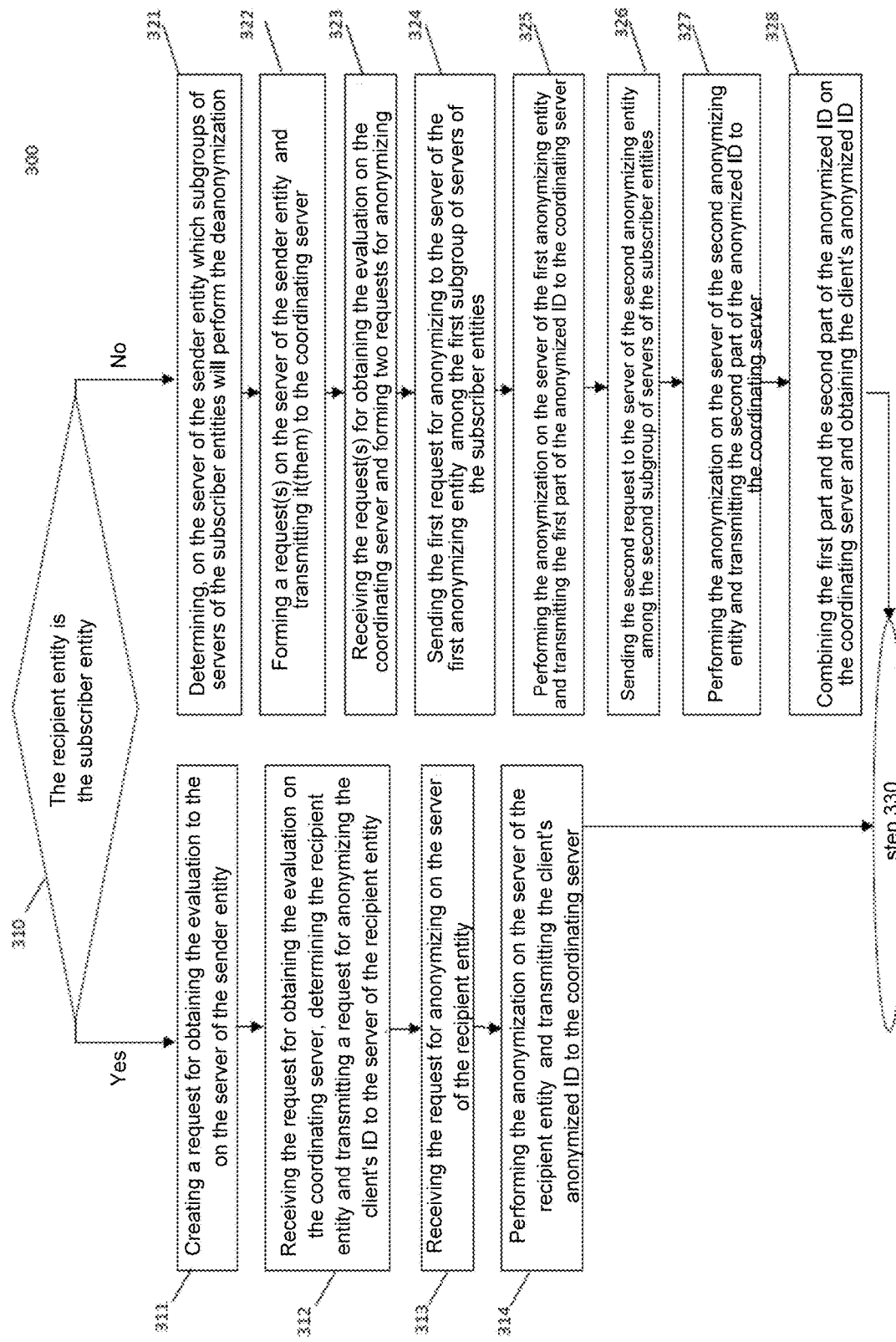
FIGS. 3A-B depicts a flowchart diagram of an operation stage of the method for processing transactions between entities, in accordance with certain non-limiting embodiments of the present technology.
Figure 3B:
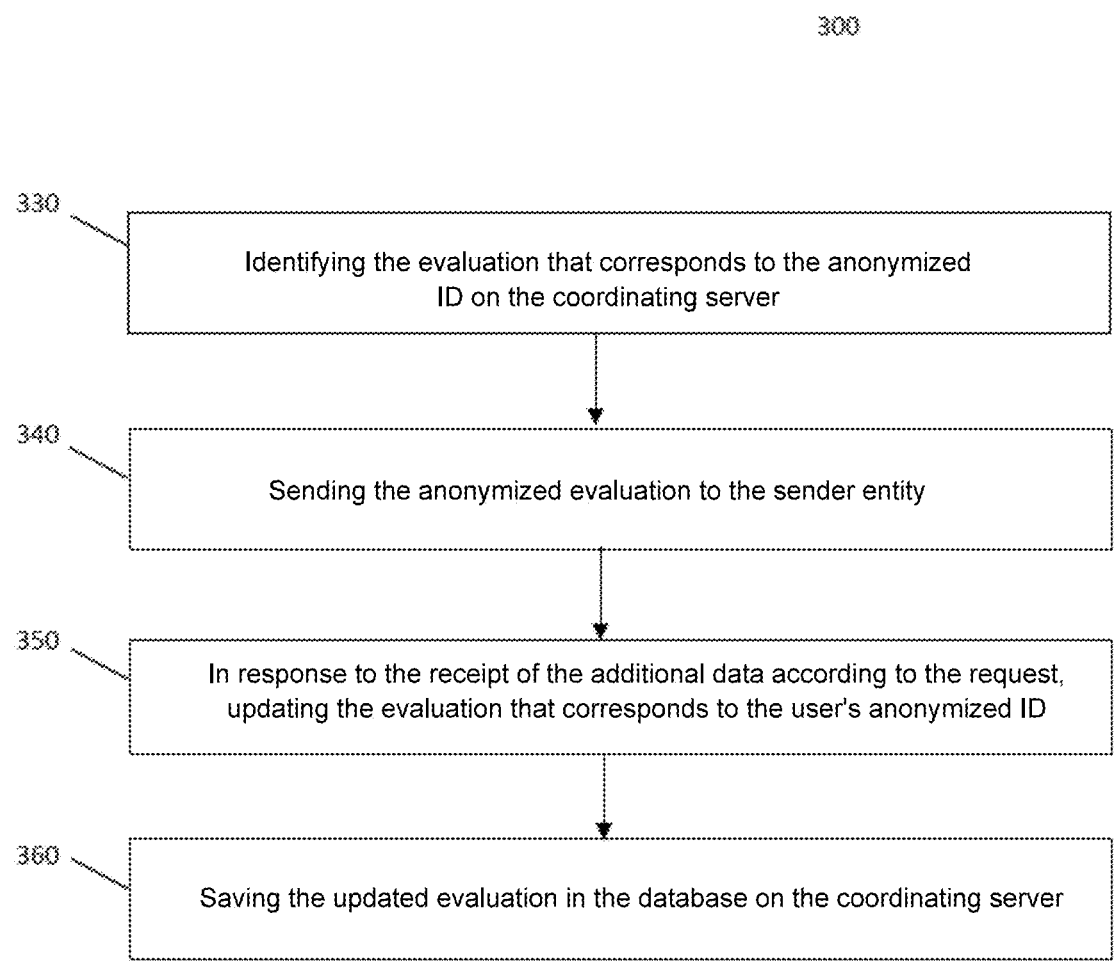

It should be expressly understood that an order of steps may differ from the one illustrated in FIGS. 3A and 3B. For example, the method may start at step 350 and then proceed to execution of steps 310-328.

Also, in some non-limiting embodiments of the present technology, the preparatory stage 200 can be omitted, and the coordinating server 110 can start the execution of the present method directly from the operational stage 300, which is also referred to as "cold start". In some non-limiting embodiments of the present technology, the coordinating server 110 can be configured to start the execution of the method from the operational stage 300 while receiving data indicative of configurations of the entities, thereby executing the preparatory and operational stages 200, 300 at least partially concurrently.

Figure 4:
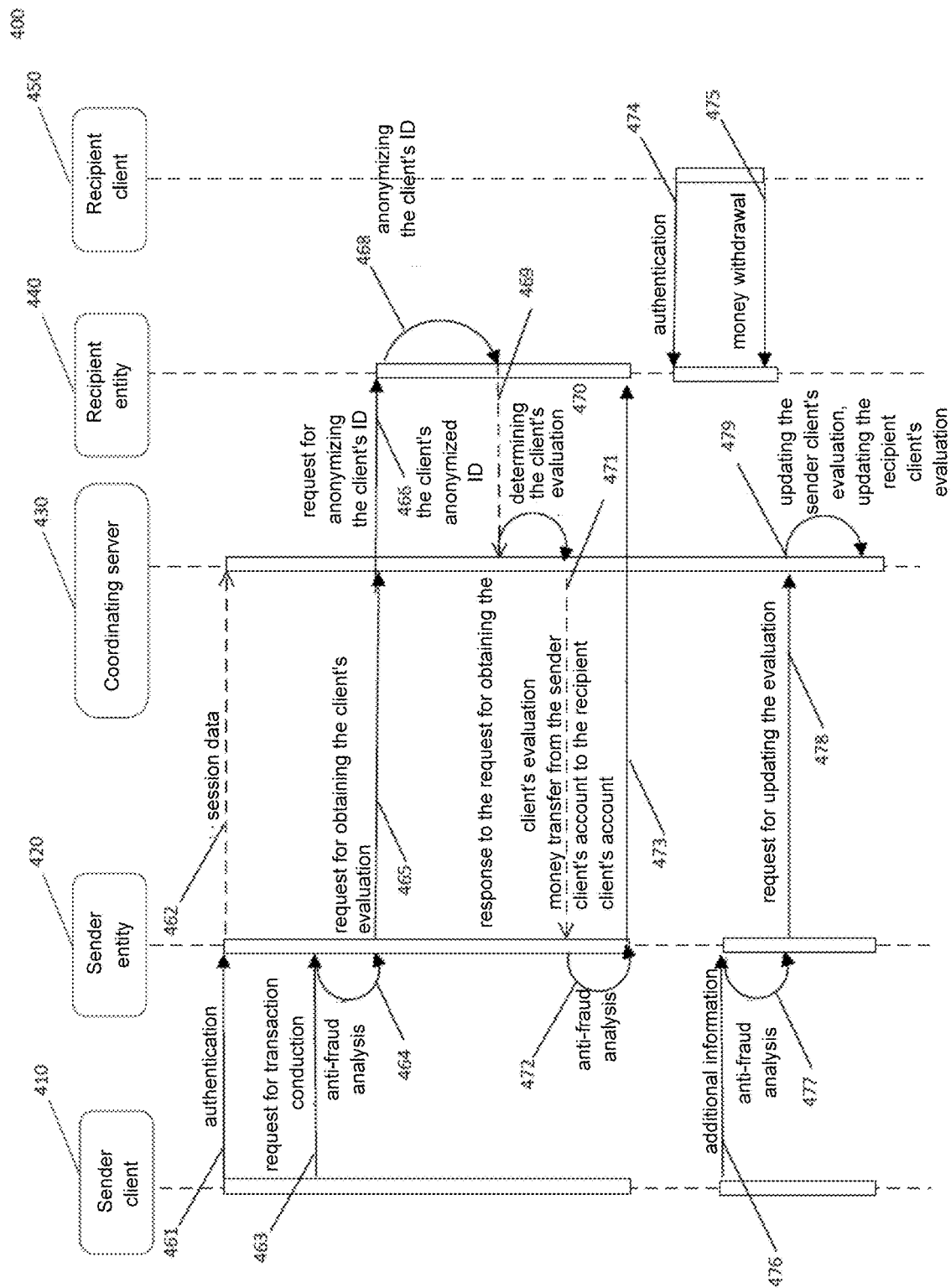
FIGS. 4-5 depicts a time diagram of execution of the method for processing transactions between entities, in accordance with certain non-limiting embodiments of the present technology.

FIG. 4 illustrates a schematic diagram of a first example of execution of the operational stage 300, in accordance with certain non-limiting embodiments of the present technology.

An authentication 461 is performed on a computing device of a sender client 410 that is served by a sender entity 420, e.g., by running a sender entity application. In some non-limiting embodiments of the present technology, the sender entity 420 may be a bank, a commercial entity or a governmental institution. A request for authentication 461 is received on a server of the sender entity 420, and, in response to the receipt of the request for authentication, a session data 462 is sent to a coordinating server 430 (which can be equated with the coordinating server 110 mentioned above). If the authorization is successful, then a transaction request 463 for a transaction with a recipient entity is sent from the computing device of the sender client via an interface of the sender entity application. In some non-limiting embodiments of the present technology, the transaction request 463 comprises details of a recipient client in the recipient entity, details of the recipient entity and details of the transaction such as a transfer amount. In various non-limiting embodiments of the present technology, depending on a type of the entity, the recipient details may be any data that allow to identify the user in the recipient entity, e.g., surname, name, patronymic, login, phone number, bank account, account number, unique number, ID of an electronic or cryptocurrency wallet etc. In response to the receipt of the transaction request, an anti-fraud analysis 464 is performed on the server of the sender entity 420. The anti-fraud analysis 464 may be any known algorithm for determining a fraud likelihood, e.g., a script may be run on the server of the sender entity 420, the script verifies whether the details of the recipient client are present in a blacklist of fraudsters or not.

If according to results of the anti-fraud analysis 464 the transaction is classified as a suspicious one, then an evaluation request 465 for obtaining a client's evaluation score will be sent from the server of the sender entity to the coordinating server 430. In some non-limiting embodiments of the present technology, the evaluation request 465 for obtaining the client's evaluation score comprises a session ID, a transaction ID, a sender client's ID, a recipient entity ID and a sender encrypted ID, as has been described in detail with the reference to FIG. 3A.

After the evaluation request 465 for obtaining the evaluation score is received on the coordinating server 430, the evaluation request 465 for obtaining the evaluation is saved and an anonymizing request 466 for anonymizing the client's ID is generated. According to certain non-limiting embodiments of the present technology, the anonymizing request 466 for anonymizing the client's ID comprises the client's encrypted ID. The anonymizing request 466 for anonymizing the client's ID is sent to the server of the recipient entity.

In response to receipt of the anonymizing request 466 for anonymizing the client's ID on the server of the recipient entity 440, the client's encrypted ID is decrypted, and the client's ID is anonymized 468, as has been described previously in detail with the reference to FIG. 3A.

The client's anonymized ID 469 is sent from the server of the recipient entity 440 to the coordinating server 430. The client's anonymized ID 469 is received on the coordinating server. Using the received client's anonymized ID, the client's evaluation score is determined in the database of the clients' evaluation scores on the coordinating server.

The evaluation score of the recipient client 450 and the transaction ID are transmitted from the coordinating server 430 to the server of the sender entity 420 as a response 471 to the evaluation request for obtaining the client's evaluation score. An other anti-fraud analysis 472 is performed on the server of the sender entity 420 in order to confirm that the obtained evaluation score of the recipient client 450 is not a fraud.

If the obtained evaluation score of the recipient client is indefinite, i.e., an information about the client's evaluation score is absent, or good, i.e., its value is above a threshold that is preset by the sender entity 420, and the other anti-fraud analysis 472 has confirmed that this evaluation is not fraud, then a money transfer 473 from the account of the sender client 410 to the account of the recipient client 450 is performed from the server of the sender entity 420.

After the money are transferred to the account of the recipient client 450, the recipient client 450 may perform an other authentication 474 in the sender entity application. In order to perform the authentication, in some non-limiting embodiments of the present technology, the recipient client 450 may use a mobile phone, a PC, a tablet or any other electronic device. Also, the recipient client 450 may perform the other authentication 474 or identity verification process by referring to the recipient entity 440 personally.

After the other authentication 474 has passed successfully, the recipient client 450 may send a request for money withdrawal 475.

After the money transfer 473 from the account of the sender client 410 to the account of the recipient client 450 is ended, the sender client 410 may send an additional information 476 to the server of the sender entity 420. For example, the additional information may be a fraud compliant. For example, the sender client 410 became a victim of a fraud scheme and transferred the money to fraudsters' account.

In response to the receipt of an additional information 476, a yet other anti-fraud analysis 477 is run on the server of the sender entity 420 in order to confirm that the additional data received from the sender client is valid. If the results of the yet other anti-fraud analysis 477 confirm that the additional information 476 is valid, an updating request 478 for updating the evaluation of the recipient client 450 is created. The updating request 478 for updating the evaluation score of the recipient client comprises the transaction ID, the updated evaluation and a reason for the evaluation change. In response to the receipt of the request 478 for updating the evaluation of the sender client 410, the evaluation score of the sender client 410 and the evaluation score of the recipient client 450 are updated 479 on the coordinating server 430. The updated clients' evaluation scores are saved in the first shared database 111 of the clients' evaluation scores.

Additionally, at step 479, a message about the evaluation score of the recipient client 450 is sent from the coordinating server 430 to the server of the recipient entity 440.

Figure 5:
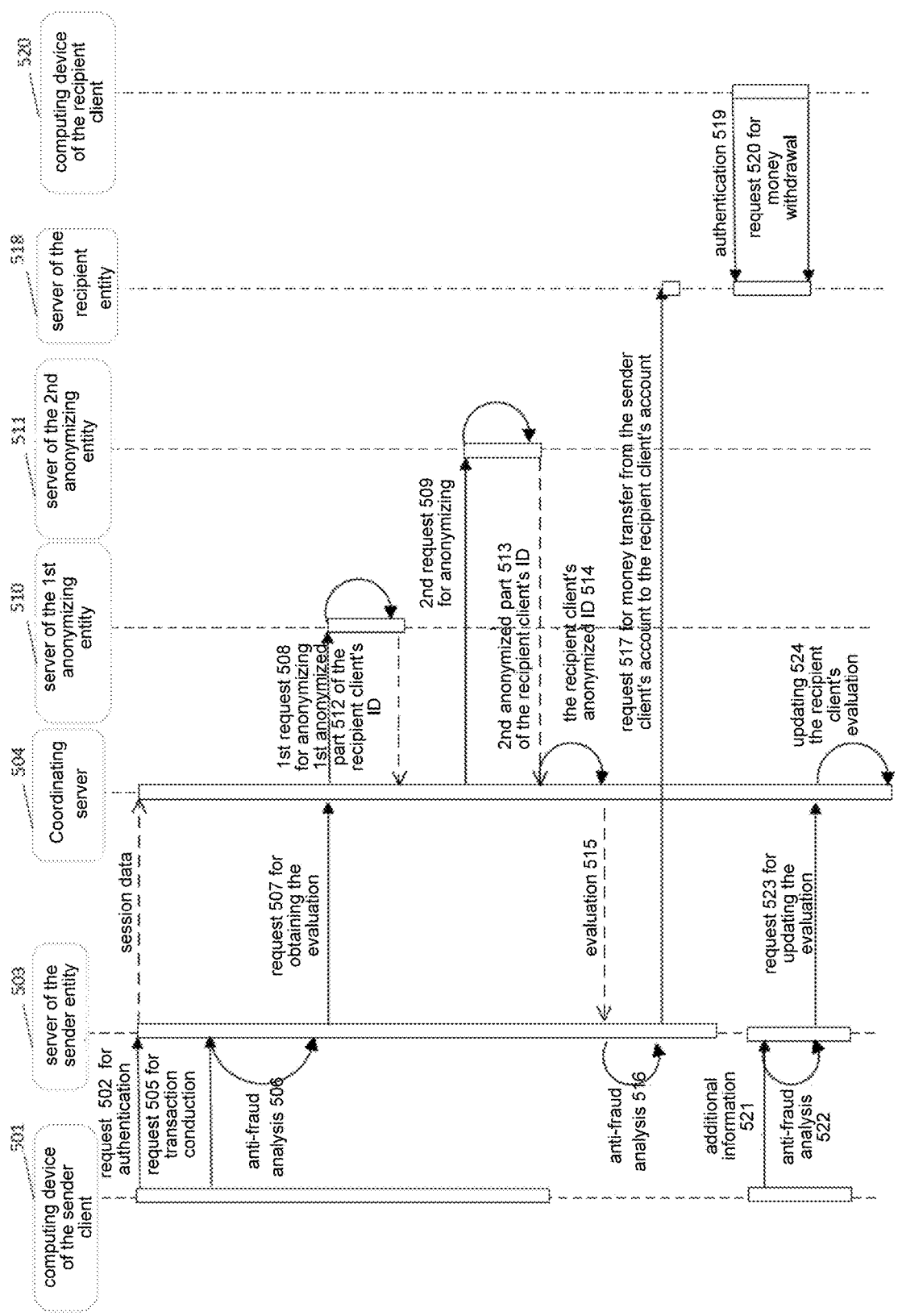

With reference to FIG. 5, there is depicted a schematic diagram of a second example of execution of the operational stage 300, in accordance with certain non-limiting embodiments of the present technology.

An authentication request 502 for authentication is created on a computing device 501 of a sender client that is served by a sender entity, e.g., by running a sender entity application. In some non-limiting embodiments of the present technology, the sender entity may be a bank, a commercial entity or a governmental institution.

Also, the authentication request 502 for authentication may be performed by physical referring of the client to a branch of the sender entity and confirming his/her identity. If the sender client refers to the sender entity personally, the authentication request 502 f may be generated using a computing device that is located at a bank branch.

The authentication request 502 is received on a sender entity server 503 of the sender entity and, in response to the receipt of the request 502 for authentication, a session data is sent to a coordinating sender entity server 503. If the authentication is successful, then a transaction request 505 is generated on the computing device 501 of the sender client via an interface of the sender entity application. The transaction request 505 comprises a recipient client data, a sender client data and the session data. The transaction request 505 is sent from the computing device 501 of the client.

In response to the receipt of the transaction request 505, an anti-fraud analysis 506 is performed on the sender entity server 503 of the sender entity in order to confirm that the transaction request 505 is valid. Further, an evaluation request 507 is created on the sender entity server 503 of the sender entity. In order to create the evaluation request 507, subgroups of subscriber entities which will perform anonymization are determined, as has been described above in detail with the reference to FIG. 3A. A recipient's ID is divided into two or more parts, as has been described further above in detail with the reference to FIG. 3A. Each of the parts of the ID can further be encrypted. The first part of the recipient client's ID is encrypted using a public key of a first anonymizing entity, where the first anonymizing entity is an entity of a first subgroup of the subscriber entities. The second part of the recipient client's ID is encrypted using a public key of a second anonymizing entity, where the second anonymizing entity is an entity of a second subgroup of the subscriber entities.

Thus, according to certain non-limiting embodiments of the present technology, the evaluation request 507 comprises the encrypted first part of the recipient client's ID, the encrypted second part of the recipient client's ID, a session ID, a transaction ID, a sender client's ID. The evaluation request 507 is sent from the sender entity server 503 of the sender entity to a coordinating server 504 (which can be equated with the coordinating server 110 mentioned above).

The coordinating server 504, in response to the receipt of the evaluation request 507, can be configured to save the evaluation request 507. Based on data obtained from the evaluation request 507, at least two anonymizing requests for anonymizing the client's ID are generated, the two anonymizing requests are a first anonymizing request 508 for anonymizing and a second anonymizing request 509 for anonymizing. The first anonymizing request 508 for anonymizing comprises a recipient client's first encrypted ID. The second anonymizing request 509 for anonymizing comprises a recipient client's second encrypted ID. The first anonymizing request 508 for anonymizing is sent to the server 510 of the first anonymizing entity. The second anonymizing request 509 for anonymizing is sent to the server 511 of the second anonymizing entity.

The first anonymizing request 508 for anonymizing is received on the server 510 of the first anonymizing entity from the coordinating server 504. The recipient client's first encrypted ID is retrieved from the first anonymizing request 508 for anonymizing and decrypted using a private key of a first subgroup of servers of subscriber entities. The decrypted first part of the ID is anonymized, as described in detail above with the reference to FIG. 3A. The anonymized first part 512 of the recipient client's ID is transmitted to the coordinating server 504.

The second anonymizing request 509 for anonymizing is received on the server 511 of the second anonymizing entity from the coordinating server 504. The recipient client's second encrypted ID is retrieved from the second anonymizing request 509 for anonymizing and decrypted using a private key of a second subgroup of servers of subscriber entities. The decrypted second part of the ID is anonymized, as described in detail with the reference to FIG. 3A. The anonymized second part 513 of the recipient client's ID is transmitted to the coordinating server 504.

The first part 512 of the recipient client's anonymized ID and the second part 513 of the recipient client's anonymized ID are received on the coordinating server 504. The coordinating server 504 can be configured to combine both parts of the recipient client's anonymized ID, e.g., using concatenation, thereby generating the recipient client's anonymized ID 514. Using the recipient client's anonymized ID 514, a corresponding evaluation score 515 is found in the shared database of the clients' evaluation scores. The evaluation score 515 is sent to the sender entity server 503 of the sender entity in response to the evaluation request 507 received previously. The response to the evaluation request 507 comprises the evaluation score 515 of the recipient client and the transaction ID.

An anti-fraud analysis 516 can be performed on the sender entity server 503 of the sender entity in order to confirm that the obtained evaluation score 515 of the recipient client is not a fraud.

If the obtained evaluation score 515 of the recipient client is indefinite or good, i.e., its value is above a threshold that is preset by the sender entity, and the anti-fraud analysis 516 has confirmed that this evaluation is not fraud, then a request 517 for money transfer from the sender client account to the recipient client account is sent from the sender entity server 503 of the sender entity to a recipient entity server 518.

After the money are transferred to the recipient client account, the recipient client may perform an authentication 519 by running an application on his/her recipient computing device 520, e.g., a mobile phone. Also, the recipient client may perform the authentication 519 or identity verification process by referring to a branch of the recipient entity personally.

After the authentication 519 has passed successfully, the recipient client may send a request 520 for money withdrawal.

After the money transfer from the sender client account to the recipient client account is completed, the sender client may send additional information 521 to the sender entity server 503 of the sender entity. For example, the additional information 521 may be a fraud compliant. For example, the sender client became a victim of a fraud scheme and transferred the money to fraudsters' account.

In response to the receipt of the additional information 521, an anti-fraud analysis 522 is run on the sender entity server 503 of the sender entity in order to confirm that the additional data received from the sender client is valid. If the results of the anti-fraud analysis 522 confirm that the additional information is valid, a request 523 for updating the evaluation is created. In some non-limiting embodiments of the present technology, the request 523 for updating the evaluation score comprises the transaction ID, the updated evaluation and a reason for the evaluation change. In response to the receipt of the request 523 for updating the evaluation, the evaluation of the recipient client is updated 524 on the coordinating server 504. Additionally, the sender client's evaluation score may be updated as well. The updated clients' evaluation scores are saved in the first shared database 111 of the clients.

At the next attempt to conduct the money transfer using the details of the recipient client, a message comprising the updated evaluation of the recipient client may be sent to the sender entity server 503 of the sender client.

Additionally, the updated evaluation of the recipient client can be sent from the coordinating server 504 to the recipient entity server 518 of the recipient entity if the recipient entity is the subscriber entity.

Computing Environment

With reference to FIG. 6, there is depicted an example functional diagram of the computing environment 600 configurable to implement certain non-limiting embodiments of the present technology including the preparatory stage 200 and the operational stage 300 of the present method described above.

In some non-limiting embodiments of the present technology, the computing environment 600 may include: the processor 601 comprising one or more central processing units (CPUs), at least one non-transitory computer-readable memory 602 (RAM), a storage 603, input/output interfaces 604, input/output means 605, data communication means 606.

According to some non-limiting embodiments of the present technology, the processor 601 may be configured to execute specific program instructions the computations as required for the computing environment 600 to function properly or to ensure the functioning of one or more of its components. The processor 601 may further be configured to execute specific machine-readable instructions stored in the at least one non-transitory computer-readable memory 602, for example, those causing the computing environment 600 to execute the preparatory stage 200 and the operational stage 300 of the present method described above.

In some non-limiting embodiments of the present technology, the machine-readable instructions representative of software components of disclosed systems may be implemented using any programming language or scripts, such as C, C++, C #, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scripts or XML. Various algorithms are implemented with any combination of the data structures, objects, processes, procedures, and other software elements.

The at least one non-transitory computer-readable memory 602 may be implemented as RAM and contains the necessary program logic to provide the requisite functionality.

The storage 603 may be implemented as at least one of an HDD drive, an SSD drive, a RAID array, a network storage, a flash memory, an optical drive (such as CD, DVD, MD, Blu-ray), etc. The storage 603 may be configured for long-term storage of various data, e.g., the aforementioned documents with user data sets, databases with the time intervals measured for each user, user IDs, etc.

The input/output interfaces 604 may comprise various interfaces, such as at least one of USB, RS632, RJ45, LPT, COM, HDMI, PS/2, Lightning, FireWire, etc.

The input/output means 605 may include at least one of a keyboard, joystick, (touchscreen) display, projector, touchpad, mouse, trackball, stylus, speakers, microphone, and the like. A communication link between each one of the input/output means 605 can be wired (for example, connecting the keyboard via a PS/2 or USB port on the chassis of the desktop PC) or wireless (for example, via a wireless link, e.g., radio link, to the base station, which is directly connected to the PC, e.g., to a USB port).

The data communication means 606 may be selected based on a particular implementation of the communication network 210 and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 600 may be linked together using a common data bus 610.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implementable method for processing transactions between clients of a plurality of entities including subscriber entities and a non-subscriber entities, the method being executed by a server communicatively coupled to servers of a plurality of subscriber entities, the server including a processor, the method comprising:
   during a first stage, executing:
      receiving, by the processor, data indicative of configurations of each of the plurality of subscriber entities from the servers of the subscriber entities; and
      storing, by the processor, the data indicative of configurations of each of the plurality of subscriber entities in a configuration database of the server, the configuration database being accessible to the servers of each of the plurality of subscriber entities; and
   during a second stage, executing:
      receiving, by the processor, from a server of a sender entity, the sender entity being one of the plurality of subscriber entities, a transaction request for a transaction between the sender entity and a recipient entity, the request comprising:
         a sender entity ID of the sender entity;
         a recipient entity ID of the recipient entity; and
         a client's encrypted ID of a client of the recipient entity;
      in response to the recipient entity being one of the plurality of subscriber entities, executing:
         transmitting, by the processor, the client's encrypted ID to an anonymizing entity server for generating a client's anonymized ID of the client of the recipient entity; and receiving, by the processor, the client's anonymized ID from the anonymizing entity server;
in response to the recipient entity being the non-subscriber entity, executing:
transmitting, by the processor, a first portion of the client's encrypted ID to a first anonymizing entity server for generating, using an anonymizing algorithm, a first anonymized portion of the client's anonymized ID;
transmitting, by the processor, a second portion of the client's encrypted ID to a second anonymizing entity server for generating, using the anonymizing algorithm, a second anonymized portion of the client's anonymized ID,
the second anonymizing entity server being different from the first anonymizing entity server;
receiving, by the processor, the first portion of the client's anonymized ID from the first anonymizing entity server;
receiving, by the processor, the second portion of the client's anonymized ID from the second anonymizing entity server; and
combining, by the processor, the first and second portions of the client's anonymized ID, thereby generating the client's anonymized ID; and
determining, by the processor, based on the client's anonymized ID, a client's evaluation score of the client of the recipient entity; and
transmitting, by the processor, the client's evaluation score to the server of the sender entity, thereby causing the server of the sender entity to allow or reject the transaction request between the sender and recipient entities based on the client's evaluation score.

2. The method of claim 1, further comprising:
storing, by the processor, the client's evaluation score in a shared database of clients' evaluation scores of the server; and
in response to receiving, by the processor, an additional information about the transaction request from the server of the sender entity:
updating, based on the additional information, the client's evaluation score of the client associated with the client's anonymized ID; and
saving, by the processor, the updated client's evaluation score in the shared database of clients' evaluation scores of the server.

3. The method of claim 2, further comprising transmitting the updated client's evaluation score to the recipient entity.

4. The method of claim 1, wherein the data indicative of configuration of a given subscriber entity of the plurality of subscriber entities comprise at least one:
a subscriber entity ID of the given subscriber entity;
a certificate of the given subscriber entity including a respective public key;
a URL of the given subscriber entity; and
templates of clients' IDs which are anonymized on the server of the given subscriber entity.

5. The method of claim 4, wherein the data indicative of configuration of the given subscriber entity further comprises a URL of a resource that confirms an authenticity of the configuration of the given subscriber entity.

6. The method of claim 5, wherein the URL of the resource is not associated with the server.

7. The method of claim 5, wherein the URL resource is an official URL of the given subscriber entity.

8. The method of claim 1, wherein, during the first stage, the method further comprises dividing, by the processor, the servers of the plurality of subscriber entities into subgroups of servers.

9. The method of claim 8, wherein the method further comprises receiving, by the processor, from each of the subgroups of servers, a respective public key.

10. The method of claim 9, wherein the respective public key is associated with a given subgroup of servers of the subscriber entities.

11. The method of claim 8, wherein the dividing the servers of the plurality of subscriber entities into the subgroups comprises executing, by the processor, a script.

12. The method of claim 11, wherein the executing the script comprises:
transmitting, by the processor, the script to the server of the sender entity, thereby causing the server of the sender entity to execute the script; and
receiving, by the processor, from the server of the sender entity, a response triggered by executing the script, the response being indicative of how the servers of the plurality of subscriber entities have been divided into the subgroups.

13. The method of claim 11, further comprising selecting, by the processor, in each subgroup of the subgroups of servers, at least one anonymizing entity server.

14. The method of claim 13, wherein the selecting comprises executing, by the processor, an other script.

15. The method of claim 14, wherein the executing the other script comprises:
transmitting, by the processor, the other script to the server of the sender entity, thereby causing the server of the sender entity to execute the other script; and
receiving, by the processor, from the server of the sender entity, a response triggered by executing the other script, the response being indicative of which server in each subgroup of the subgroups of servers has been selected as the at least one anonymizing server.

16. The method of claim 1, wherein the receiving the data indicative of the configuration of each one of the plurality of subscriber entities further comprises receiving, therefrom, clients' anonymized IDs and evaluation scores of clients of each one of the plurality of subscriber entities.

17. The method of claim 16, further comprising assigning the clients' anonymized IDs with respective ones of clients' evaluation scores received from a respective subscriber entity.

18. The method of claim 16, wherein, during the first stage, the method further comprises creating a shared database of the clients' evaluation scores based on the received clients' anonymized IDs and evaluation scores.

19. The method of claim 18, wherein the shared database of the clients' anonymized evaluation scores is configured to store at least one of:
the client's anonymized IDs;
the client's evaluation scores that are associated with the client's anonymized ID;
non-subscriber entity IDs; and
subscriber entity IDs.

20. The method of claim 19, further comprising receiving, by the processor, at least one redundant client's anonymized ID associated with the client's anonymized ID,
both the client's anonymized ID and at least one redundant client's anonymized ID being associated with a same client.

21. The method of claim 20, wherein the at least one redundant client's anonymized ID is similar to the client's anonymized ID.

22. The method of claim 21, wherein the receiving the at least one redundant client's ID is in response to at least one additional request to the anonymizing entity server.

23. The method of claim 22, wherein the at least one additional request is triggered by the processor of the server.

24. The method of claim 1, wherein the anonymizing entity server is a server of the recipient entity.

25. The method of claim 1, wherein the anonymizing entity server is one of the servers of the plurality of subscriber entities.

26. The method of claim 1, wherein the client's encrypted ID includes a first encrypted portion and a second portion of the client's encrypted ID.

27. The method of claim 1, wherein the client's encrypted ID has been encrypted using an asymmetric encryption algorithm.

28. The method of claim 1, wherein the client's encrypted ID has been encrypted using a symmetric encryption algorithm.

29. The method of claim 28, wherein the client's encrypted ID has been encrypted further using a unique key of the server of the recipient entity.

30. The method of claim 28, wherein the client's encrypted ID has been encrypted further using a private key of the server of the recipient entity.

31. The method of claim 1, wherein the first anonymizing entity server is a first available entity server among a first subgroup of the subscriber entities.

32. The method of claim 31, wherein the second anonymizing subscriber entity server is a first available entity among a second subgroup of the subscriber entities, the first and second subgroups not overlapping.

33. The method of claim 1, wherein the combining of the first portion of the client's anonymized ID with the second portion of the client's anonymized ID comprises concatenating the first second portions of the client's anonymized ID.

34. The method of claim 1, wherein a given subscriber entity of the plurality of subscriber entities is an entity that transmits, to the server, in advance, at least one of:
  data for creating a shared database of the clients' anonymized evaluation scores;
  the data indicative of the configuration of the given subscriber entity.

35. The method of claim 1, wherein the anonymizing algorithm comprises one of a hashing algorithm and a symmetric encryption algorithm.

36. The method of claim 1, wherein the first stage is executed prior to the second stage.

37. The method of claim 1, wherein the first stage and the second stage are executed at least partially concurrently.

38. The method of claim 1, wherein to combine the first portion of the client's anonymized ID with the second portion of the client's anonymized ID, the processor is configured to concatenate the first second portions of the client's anonymized ID.

39. The method of claim 1, wherein the processor is configured to execute the first stage prior to the second stage.

40. The method of claim 1, wherein the processor is configured to execute the first stage and the second stage at least partially concurrently.

41. A server for processing transactions between clients of a plurality of entities including subscriber entities and a non-subscriber entities, the server comprising: (i) a processor and (ii) a non-transitory computer-readable memory storing instructions; and
  the processor, upon executing the instructions, being configured to:
  during a first stage, execute:
    receiving data indicative of configurations of each of the plurality of subscriber entities from the servers of the subscriber entities; and
    storing the data indicative of configurations of each of the plurality of subscriber entities in a configuration database of the server, the configuration database being accessible to the servers of each of the plurality of subscriber entities; and
  during a second stage, execute:
    receiving, from a server of a sender entity, the sender entity being one of the plurality of subscriber entities, a transaction request for a transaction between the sender entity and a recipient entity, the request comprising:
      a sender entity ID of the sender entity;
      a recipient entity ID of the recipient entity; and
      a client's encrypted ID of a client of the recipient entity;
    in response to the recipient entity being one of the plurality of subscriber entities, executing:
      transmitting the client's encrypted ID to an anonymizing entity server for generating a client's anonymized ID of the client of the recipient entity; and
      receiving the client's anonymized ID from the anonymizing entity server;
    in response to the recipient entity being the non-subscriber entity, executing:
      transmitting a first portion of the client's encrypted ID to a first anonymizing entity server for generating, using an anonymizing algorithm, a first anonymized portion of the client's anonymized ID;
      transmitting a second portion of the client's encrypted ID to a second anonymizing entity server for generating, using the anonymizing algorithm, a second anonymized portion of the client's anonymized ID, the second anonymizing entity server being different from the first anonymizing entity server;
      receiving the first portion of the client's anonymized ID from the first anonymizing entity server;
      receiving the second portion of the client's anonymized ID from the second anonymizing entity server; and
      combining the first and second portions of the client's anonymized ID, thereby generating the client's anonymized ID; and
    determining, based on the client's anonymized ID, a client's evaluation score of the client of the recipient entity; and
    transmitting the client's evaluation score to the server of the sender entity, thereby causing the server of the sender entity to allow or reject the transaction request between the sender and recipient entities based on the client's evaluation score.

42. The server of claim 41, wherein the processor is further configured to:
  store the client's evaluation score in a shared database of clients' evaluation scores of the server; and
  in response to receiving an additional information about the transaction request from the server of the sender entity:

update, based on the additional information, the client's evaluation score of the client associated with the client's anonymized ID; and save the updated client's evaluation score in the shared database of clients' evaluation scores of the server.

43. The server of claim 41, wherein, during the first stage, the processor is further configured to divide the servers of the plurality of subscriber entities into subgroups of servers.

44. The server of claim 43, wherein to divide the servers of the plurality of subscriber entities into the subgroups, the processor is configured to execute a script.

45. The server of claim 44, wherein to execute the script, the processor is configured to:
transmit the script to the server of the sender entity, thereby causing the server of the sender entity to execute the script; and
receive, from the server of the sender entity, a response triggered by executing the script, the response being indicative of how the servers of the plurality of subscriber entities have been divided into the subgroups.

46. The server of claim 43, wherein the processor is further configured to select, in each subgroup of the subgroups of servers, at least one anonymizing entity server.

47. The server of claim 46, wherein to select the at least one anonymizing entity server, the processor is configured to execute an other script.

48. The server of claim 47, wherein to execute the other script, the processor is configured to:
transmit the other script to the server of the sender entity, thereby causing the server of the sender entity to execute the other script; and
receive, from the server of the sender entity, a response triggered by executing the other script, the response being indicative of which server in each subgroup of the subgroups of servers has been selected as the at least one anonymizing server.

49. The server of claim 41, wherein to receive the data indicative of the configuration of each one of the plurality of subscriber entities, the processor is configured to receive, from each one of the plurality of subscriber entities, clients' anonymized IDs and evaluation scores of clients of each one of the plurality of subscriber entities.

50. The server of claim 49, wherein the processor is further configured to assign the clients' anonymized IDs with respective ones of clients' evaluation scores received from a respective subscriber entity.

51. The server of claim 49, wherein, during the first stage, the processor is further configured to create a shared database of the clients' evaluation scores based on the received clients' anonymized IDs and evaluation scores,
the shared database of clients' evaluation scores being configured to store at least one of:
the client's anonymized IDs;
the client's evaluation scores that are associated with the client's anonymized ID;
non-subscriber entity IDs; and
subscriber entity IDs.

52. The server of claim 51, wherein the processor is further configured to receive at least one redundant client's anonymized ID associated with the client's anonymized ID,
both the client's anonymized ID and at least one redundant client's anonymized ID being associated with a same client; and
the at least one redundant client's anonymized ID being similar to the client's anonymized ID.

53. The server of claim 52, wherein the processor is configured to receive the at least one redundant client's ID in response to at least one additional request to the anonymizing entity server.

54. The server of claim 53, wherein the processor is configured to trigger the at least one additional request.

* * * * *